United States Patent
Yamazaki et al.

(10) Patent No.: US 10,893,384 B2
(45) Date of Patent: Jan. 12, 2021

(54) METHODS AND SYSTEMS FOR MANAGING HISTORICAL GEOLOCATION DATA FOR A PLURALITY OF MOBILE DEVICES

(71) Applicant: Verizon Patent and Licensing Inc., Basking Ridge, NJ (US)

(72) Inventors: Kumiko Yamazaki, Arvada, CO (US); Florin Alexandrescu, Denver, CO (US); Michael Wille, Denver, CO (US); Chad Francis, Golden, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/059,006

(22) Filed: Aug. 8, 2018

(65) Prior Publication Data

US 2020/0053511 A1 Feb. 13, 2020

(51) Int. Cl.
*H04W 4/029* (2018.01)
*G06F 16/29* (2019.01)
*G06F 16/909* (2019.01)
*G09B 29/00* (2006.01)
*H04L 29/08* (2006.01)

(52) U.S. Cl.
CPC ............ *H04W 4/029* (2018.02); *G06F 16/29* (2019.01); *G06F 16/909* (2019.01); *G09B 29/007* (2013.01); *H04L 67/22* (2013.01)

(58) Field of Classification Search
CPC ....... H04W 4/02; H04W 4/029; H04W 4/021; H04W 4/027; H04W 4/023; H04W 4/21; H04W 64/00
See application file for complete search history.

(56) References Cited

U.S. PATENT DOCUMENTS

| | | | | |
|---|---|---|---|---|
| 8,611,326 | B2 * | 12/2013 | Huang | G01S 5/0027 370/346 |
| 9,609,495 | B2 * | 3/2017 | Kotecha | H04W 4/21 |
| 2015/0271645 | A1 * | 9/2015 | Wyatt | H04W 4/029 455/456.2 |
| 2016/0066155 | A1 * | 3/2016 | Fan | G06F 3/0484 455/457 |
| 2018/0059767 | A1 * | 3/2018 | Vaccari | G06F 16/9537 |
| 2019/0327580 | A1 * | 10/2019 | Chang | H04W 4/029 |

* cited by examiner

*Primary Examiner* — Nam T Huynh

(57) ABSTRACT

An exemplary geolocation data management system identifies a passive monitoring pattern for tracking a geolocation of a mobile device and tracks the geolocation of the mobile device as the mobile device traverses a path during a time period. The system tracks the geolocation by determining geolocations in accordance with the identified passive monitoring pattern and by generating corresponding geolocation records for the mobile device. Based on a contiguous subset of these geolocation records, the system determines that the mobile device dwelled at a particular geolocation for a time interval and generates a dwell record for the mobile device. The system further presents, by way of a user interface, a map indicating the path traversed by the mobile device during the time period. The map shows a geolocation record and the dwell record to be visually differentiable from one another. Corresponding methods and systems are also disclosed.

20 Claims, 11 Drawing Sheets

METHODS AND SYSTEMS FOR MANAGING HISTORICAL GEOLOCATION DATA FOR A PLURALITY OF MOBILE DEVICES

BACKGROUND INFORMATION

Use of mobile devices has proliferated in recent years. Because many of these mobile devices include hardware and software for determining and reporting real-time geolocations of the mobile devices, various applications using such geolocation data have been developed and have gained in popularity. For example, geospatial navigational software and other mobile applications help users navigate the world, find and access services and/or people based on their real-time geolocations, and even contribute real-time location data to crowd-sourced databases used by the community (e.g., real-time traffic data, etc.).

In some examples, a mobile application executing on a mobile device may be configured to report a geolocation of the mobile device that may be used to track the mobile device and the person using it in substantially real time (e.g., once per second). For example, reported geolocations may be used by fleet management systems to determine where each vehicle included in a fleet of vehicles is located at any particular time (e.g., to facilitate dispatch services provided by the vehicles, to track progress of the vehicles along predetermined routes, etc.). While real-time tracking of mobile devices may provide various benefits, it may also require significant consumption of mobile device battery life and may not facilitate an analysis of greater trends in user behavior over time. Accordingly, there remains room for improvement in identifying and presenting historical geolocation data and behavioral trends derived therefrom.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
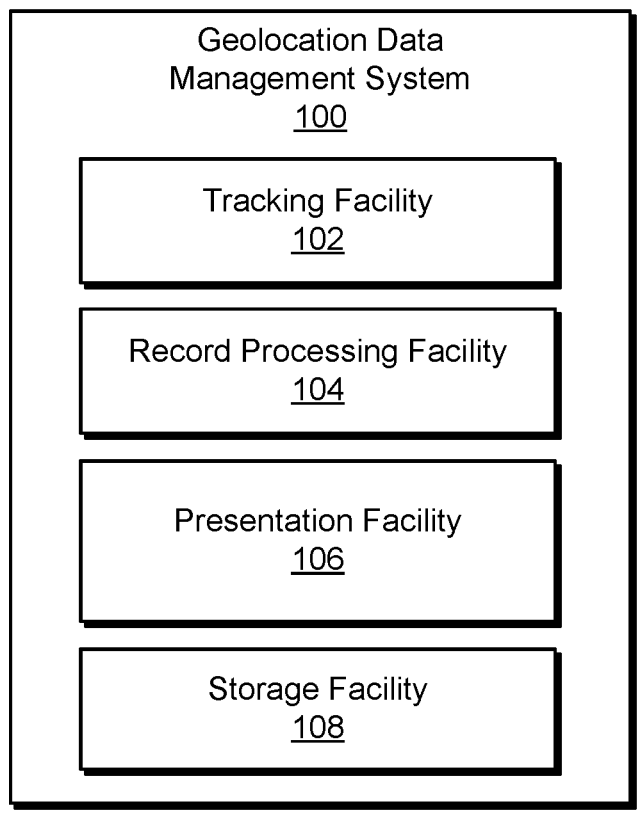
FIG. 1 illustrates an exemplary geolocation data management system for managing historical geolocation data for a plurality of mobile devices according to principles described herein.

Methods and systems for managing historical geolocation data for a plurality of mobile devices are described herein. As used herein, "historical geolocation data" refers to any data (e.g., including geolocation records, dwell records, and so forth as will be described in detail below) that may relate to a geolocation of a mobile device (and/or a user of that mobile device) at a time or over a period of time that is in the past. As such, historical geolocation data may be differentiated from what may be referred to herein as "real-time geolocation data," which may relate to a current geolocation of a mobile device without regard to any previous geolocation of the mobile device. Accordingly, methods and systems described herein may be said to "manage" historical geolocation data by accumulating (e.g., accessing, receiving, collecting, etc.), deriving, storing, analyzing (e.g., determining trends from), providing, presenting, and/or otherwise maintaining or making use of historical geolocation data in any manner as may serve a particular implementation.

As one example, a geolocation data management system in accordance with the disclosure provided herein may be configured to manage historical geolocations of a plurality of mobile devices by performing the following operations in any of the ways described herein. Specifically, referring to one particular mobile device included within the plurality of mobile devices as an example, the geolocation data management system may identify a passive monitoring pattern for tracking a geolocation of the mobile device. For instance, as will be described in more detail below, the passive monitoring pattern may be a time-based monitoring pattern configured to invoke the mobile device to provide an updated geolocation according to a time-based schedule, an event-based monitoring pattern configured to invoke the mobile device to provide the updated geolocation upon an occurrence of a predetermined event, a combination passive monitoring pattern including aspects of both of the above, or another suitable type of passive monitoring pattern.

Regardless, in contrast with conventional active monitoring patterns that may be employed to perform substantially continuous real-time tracking by invoking mobile devices to provide updated geolocations frequently and consistently (e.g., once per second or the like), the passive monitoring pattern identified by the geolocation data management system may be "passive" in the sense that the updated geolocation reporting may be invoked far less frequently than is typical with conventional monitoring patterns (e.g., on the order of several minutes or longer between updates in some examples, rather than a few seconds or less). For instance, the passive monitoring pattern may be configured to invoke the mobile device to provide an updated geolocation only once every several minutes, only when it is detected that the mobile device is actually moving (i.e., thus not invoking any report to be made during potentially long periods of time when the mobile device is stationary), or with any other suitable pattern or granularity as may serve a particular implementation. For example, as will be described in more detail below, the passive monitoring pattern identified may be automatically or manually set up with an aim to provide suitable functionality and accuracy (which may be generally improved with more frequent geolocation reporting) while balancing suitable battery life and data usage (which may be generally improved with less frequent geolocation reporting).

The geolocation data management system may track the geolocation of the mobile device as the mobile device traverses a path during a time period (e.g., over the course of a day in one example). For instance, this tracking of the geolocation of the mobile device may include determining (e.g., throughout the time period and in accordance with the identified passive monitoring pattern) a plurality of geolocations of the mobile device as the mobile device traverses the path, and generating a plurality of geolocation records for the mobile device. In some examples, each geolocation record in the plurality of geolocation records generated may include a timestamped coordinate set reported by the mobile device for a different one of the plurality of geolocations of the mobile device as the mobile device traverses the path.

Based on a contiguous subset of geolocation records from the plurality of geolocation records generated for the mobile device, the geolocation data management system may determine that the mobile device dwelled at a particular geolocation included within the plurality of geolocations for a time interval of at least a predetermined amount of time during the time period. Based on that determination, the geolocation data management system may generate a dwell record for the mobile device. For instance, the dwell record may include a coordinate set for the particular geolocation and an interval timestamp representative of the time interval. The geolocation data management system may then present, by way of a user interface, a map indicating the path traversed by the mobile device during the time period. For example, the map may include a representation of at least one geolocation record included in the plurality of geolocation records and a representation of the dwell record that is visually differentiable from the representation of the at least one geolocation record.

Methods and systems described herein for managing historical geolocation data for a plurality of mobile devices provide various advantages, benefits, and improvements in comparison to conventional device tracking systems. In particular, by going beyond real-time geolocation data to managing historical geolocation data, people using methods and systems described herein (referred to herein as "users") may be able to not only track mobile devices and the people using them (referred to herein as "clients"), but may also be able to easily identify movement trends of the mobile devices to help detect and prove behavioral patterns of the clients. For example, by identifying geolocations where clients dwell (i.e., spend a predetermined amount of time rather than passing through), geolocation data management systems and methods described herein may also determine and record points of interest associated with the geolocations where the clients have been detected to spend time. Being provided with information about the points of interest where clients spend their time, users such as fleet managers may be facilitated in better managing their fleets (e.g., by providing and testing different incentives intended to modify behavior and improve efficiency). In other examples, this type of information may facilitate users such as advertisers in targeting relevant advertising to the clients at relevant times.

As another exemplary benefit, the methods and systems described herein may perform the operations described herein with significant flexibility. For instance, a geolocation data management system may direct a mobile device to report its geolocation in accordance with a customizable passive monitoring pattern so that the mobile device may be tracked in the background all the time (e.g., rather than just during working hours when the user is on an active shift) without having a noticeable effect on the battery life or network throughput of the mobile device. This flexibility and customizability may allow users of the system or clients using the mobile device to make desired tradeoffs between functionality and battery life in accordance with various circumstances. For example, these tradeoffs may be implemented dynamically and/or automatically based on rules (time of day, speed of movement, current battery life, etc.), predetermined schedules, and so forth.

Various embodiments will now be described in more detail with reference to the figures. The disclosed systems and methods may provide one or more of the benefits mentioned above and/or various additional and/or alternative benefits that will be made apparent herein.

FIG. 1 illustrates an exemplary geolocation data management system 100 ("system 100") for managing historical geolocation data for a plurality of mobile devices. As shown, system 100 may include, without limitation, a tracking facility 102, a record processing facility 104, a presentation facility 106, and a storage facility 108 selectively and communicatively coupled to one another. It will be recognized that although facilities 102 through 108 are shown to be separate facilities in FIG. 1, facilities 102 through 108 may be combined into fewer facilities, such as into a single facility, or divided into more facilities as may serve a particular implementation. In some examples, facilities 102 through 108 may be distributed between multiple devices and/or multiple locations as may serve a particular implementation. Additionally, one or more of facilities 102 through 108 may be omitted from system 100 in certain implementations, while additional facilities may be included within system 100 in the same or other implementations.

In certain implementations, facilities 102 through 108 may be configured to operate in real time so as to track geolocation data for a plurality of mobile devices as the mobile devices are being carried to different geolocations by the respective clients using them. In this way, as will be described in more detail below, certain operations may be performed that are advantageous to be performed in real time, such as providing advertisements, offers, etc., to a client at an appropriate time when the client is determined to be located at (or to be moving toward) a particular point of interest. As used herein, operations may be performed in "real time" when they are performed immediately and without undue delay. For example, real-time data processing operations may be completed while the mobile device is located (or is at least expected to be located) at the reported geolocation, even if there is some amount of delay such as a few seconds.

As mentioned above, however, facilities 102 through 108 may also be configured to manage historical geolocation data for mobile devices (i.e., geolocation data that is associated with a time in the more distant past than real-time geolocation data). For example, as will be made apparent in the description below, many of the benefits provided by the methods and systems described herein may relate to tracking, storing, analyzing, presenting, and otherwise managing information about paths mobile devices have traversed in the past, rather than only where the mobile devices are currently located in the present.

Each of facilities 102 through 108 may include or be implemented by one or more physical computing devices such as hardware and/or software components (e.g., processors, memories, communication interfaces, instructions stored in memory for execution by the processors, etc.). For instance, the facilities may be implemented using separate computing components unique to each facility, or may be implemented using shared computing components. Each of facilities 102 through 108 will now be described in more detail.

Tracking facility 102 may be configured to perform various operations associated with tracking the geolocations of mobile devices included within a plurality of mobile devices for which system 100 manages geolocation data. Specifically, referring to one particular mobile device within the plurality of mobile devices as an example, tracking facility 102 may perform operations to track the geolocation of the mobile device as the mobile device traverses a path during a time period (e.g., a time period including a single shift of a client being tracked, a full day, a full week, etc.). To this end, tracking facility 102 may be configured to determine a plurality of geolocations of the mobile device as the mobile device traverses the path throughout the time period. For example, tracking facility 102 may determine the geolocations by requesting, retrieving, and/or otherwise accessing or receiving geolocation data from the mobile device in accordance with a particular passive monitoring pattern (described in more detail below).

Upon determining the plurality of geolocations, tracking facility 102 may further be configured to generate a plurality of geolocations records for the mobile device. For example, each geolocation record generated in the plurality of geolocation records for the mobile device may include a timestamped coordinate set reported by the mobile device for a different one of the plurality of geolocations of the mobile device determined as the mobile device traverses the path. Exemplary geolocation records with exemplary timestamped coordinate sets, as well as other aspects of mobile device tracking performed by tracking facility 102, will be illustrated and described in more detail below.

Record processing facility 104 may be configured to perform various operations associated with directing the generation and/or accumulation of geolocation records by tracking facility 104 and processing and analyzing the geolocations records being generated and accumulated. For example, record processing facility 104 may identify the passive monitoring pattern mentioned above to be used by tracking facility 102 for tracking the geolocation of the mobile device, and may provide the identified passive monitoring pattern to tracking facility 102 for tracking facility 102 to use the passive monitoring pattern in any of the ways described herein. Record processing facility 104 may identify the passive monitoring pattern in any suitable manner (e.g., by generating the passive monitoring pattern, receiving the passive monitoring pattern from any of various sources, etc.), as will be described in more detail below.

In addition to directing the generation of the geolocation records by identifying and providing the passive monitoring pattern, record processing facility 104 may also receive and analyze the geolocation records from tracking facility 102 in various ways described herein. For example, record processing facility 104 may be configured to determine, based on a contiguous subset of geolocation records received from tracking facility 102, that the mobile device dwelled at a particular geolocation included within the plurality of geolocations for a time interval of at least a predetermined amount of time during the time period. As such, record processing facility 104 may generate (e.g., based on the determining that the mobile device dwelled at the particular geolocation for at least the predetermined amount of time) a dwell record for the mobile device. Dwell records may be similar to geolocation records but, in some examples, may represent conglomerations of several similar geolocation records. For example, a dwell record generated by record processing facility 104 may include a coordinate set for a particular geolocation and an interval timestamp representative of the time interval for which the mobile device dwelled at the particular geolocation. Exemplary dwell records and techniques for generating them will be described in more detail below.

Presentation facility 106 may be configured to perform various operations associated with generating a user interface in order to present information gathered and/or processed by facilities 102 and 104 in various ways as may be useful to a user of system 100. For example, presentation facility 106 may present, by way of a user interface, a map indicating the path traversed by the mobile device during the time period. In some examples, the map may include a representation of at least one geolocation record included in the plurality of geolocation records generated by tracking facility 102, and may further include a representation of at least one dwell record generated by record processing facility 104. Moreover, presentation facility 106 may make it easy and convenient for a user of system 100 to differentiate geolocations where the client carrying the mobile device dwelled from geolocations where the client passed through briefly. This may be done, for instance, by presenting representations of dwell records that are visually differentiable from representations geolocation records. For example, as will be described and illustrated in more detail below, presentation facility 106 may present record icons on the map that have different shapes or different colors or the like to make it easy for the user to visually analyze where the client passed through and where the client dwelled.

Storage facility 108 may store and maintain any data used by facilities 102 through 106 (and/or any other facilities included within system 100 not explicitly shown) to perform any of the operations described herein. For example, storage facility 108 may include program instructions for performing the operations described herein, as well as other data received, generated, managed, maintained, used, and/or transmitted by facilities 102 through 106 as may serve a particular implementation. In some examples, for instance, storage facility 108 may include data representative of passive monitoring patterns, data representative of factors used to identify passive monitoring patterns (e.g., rules, status flags, etc.), data representative of geolocation records, data representative of dwell records, data representative of maps presented to a user, and so forth.

Figure 2:
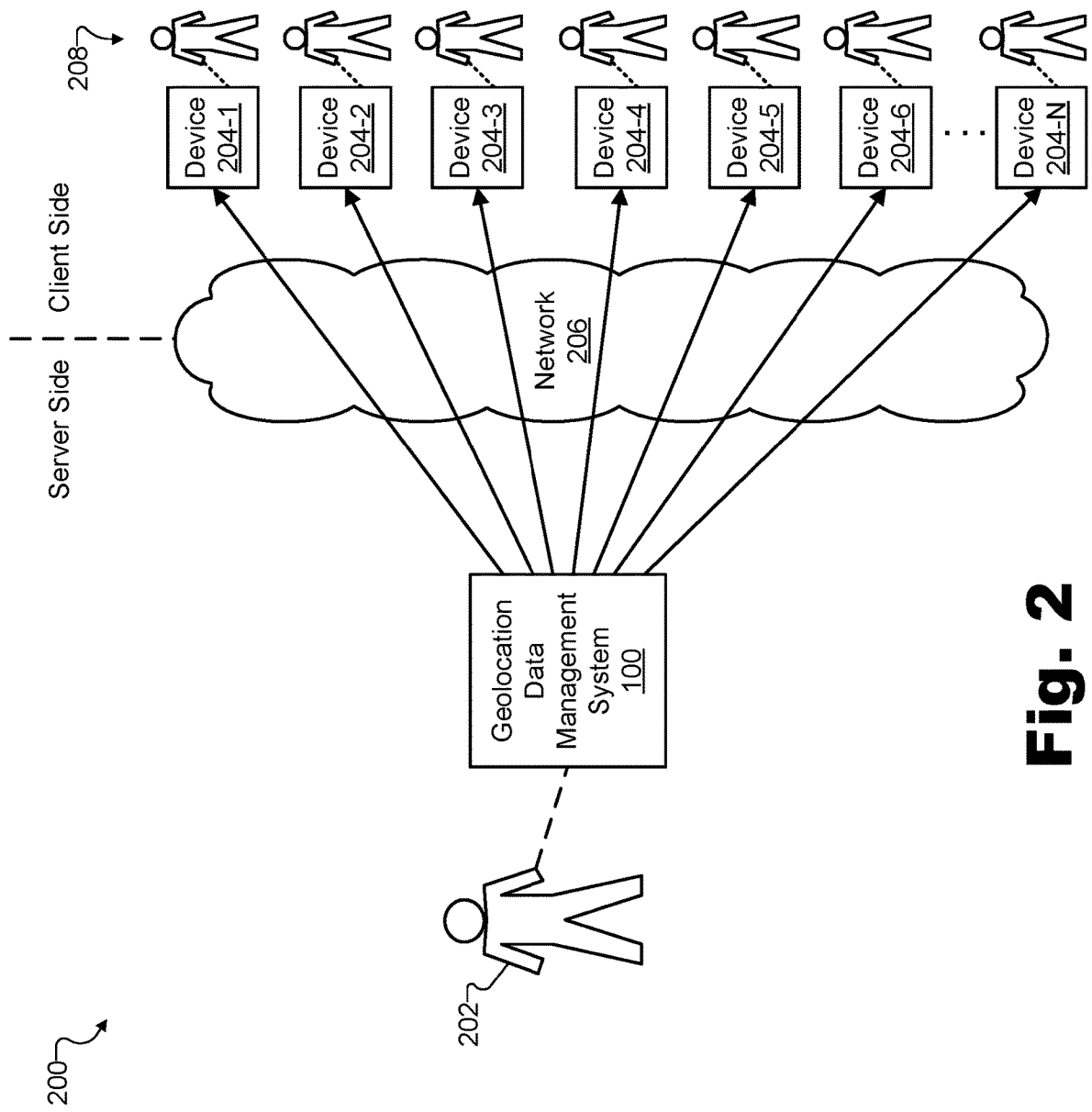
FIG. 2 illustrates an exemplary configuration in which the geolocation data management system of FIG. 1 may operate to manage historical geolocation data for a plurality of mobile devices according to principles described herein.

FIG. 2 illustrates an exemplary configuration 200 in which system 100 may operate to manage historical geolocation data for a plurality of mobile devices. Specifically, as shown, system 100 may be operated by a user 202 on a server side of a server-client data delivery architecture or service. Under direction from user 202, system 100 may communicate with a plurality of mobile devices 204 (e.g., mobile devices 204-1 through 204-N) on a client side of the server-client data delivery architecture or service. Specifically, system 100 may be communicatively coupled with mobile devices 204 by way of a network 206.

System 100 may be implemented by one or more servers or other computing systems operated by a service provider such as a cellular network service provider or the like. Additionally, system 100 may include an interface configured to facilitate user 202 in directing system 100 to perform any of the operations described herein. Exemplary user interfaces provided by system 100 and operations performed by system 100 will be described and illustrated in more detail below.

Network 206 may facilitate data delivery between server-side systems such as system 100 and client-side systems such as mobile devices 204 in the server-client data delivery architecture illustrated by configuration 200. As such, network 206 may include a wireless local area network (e.g., a Wi-Fi network), a provider-specific wired or wireless network (e.g., a cable or satellite carrier network, a mobile telephone network, etc.), the Internet, a wide area network, a content delivery network, and/or any other suitable network or networks, and data may be distributed using any suitable communication technologies included within network 206. As such, data may flow between system 100 and mobile devices 204 using any communication technologies, devices, media, and protocols as may serve a particular implementation.

Mobile devices 204 may be implemented as any type of mobile devices able to determine and report a geolocation. For example, mobile devices 204 may be mobile phones (e.g., smartphones), tablet devices, laptop computers, or the like. Each mobile device 204 may be located at a different geolocation at any given moment in time as clients 208 carry mobile devices 204 on different respective paths during the course of the clients' lives. For example, clients 208 may carry their respective mobile devices 204 during work shifts that the clients perform during the day, as well as during recreational and personal activities that the clients enjoy in the evenings, nights, weekends, and so forth.

At any of these times, mobile devices 204 may be configured (e.g., in accordance with a passive monitoring pattern as will be described in more detail below) to determine and report its geolocation to system 100 to allow system 100 to track the mobile devices in any of the ways described herein. This may be performed in any suitable manner. For example, a mobile device 204 may be located within a wireless footprint of a wireless network included within network 206 (e.g., a mobile data network, a wireless local area networks ("WLANs"), etc.) and may determine and/or report its geolocation based on the wireless network. In other examples, a mobile device 204 may determine its geolocation based on a satellite-based or other suitable positioning system (e.g., the Global Positioning System ("GPS") or the like), and may report the geolocation to system 100 using wired and/or wireless technologies included within network 206.

Because respective clients 208 may use mobile devices 204 and carry the devices with them, tracking mobile devices 204 may, in some examples, be equivalent to tracking clients 208. As such, system 100 may be useful for various types of applications in the context of configuration 200.

As one example, system 100 may be used in a fleet management application. In this case, user 202 may be a fleet manager responsible for managing a plurality of motor vehicles (e.g., cars, trucks, construction machinery, trailers, etc.), and system 100 may be configured to track clients 208 as they each conduct different vehicles in the fleet. For example, user 202 may be responsible for dispatching vehicles included in a taxi service, dispatching emergency service workers (e.g., police, firefighters, emergency medical technicians, etc.), managing a parcel delivery service, overseeing at-home services (e.g., a pest control service, a lawn fertilization service), managing a food delivery service (e.g., a pizza delivery service), or the like. In these examples, it may be desirable for user 202 to keep tabs on several workers and vehicles at once (e.g., in real time) as well as to analyze the performance and behaviors of the workers over a large scale of time (e.g., to determine behaviors over the course of weeks or months) and/or during, before, and/or after work hours. In this way, user 202 may determine patterns that allows user 202 to perform his or her job more effectively, to thereby improve services that the fleet being managed is providing. In other examples, user 202 may manage other types of fleets, such as those involving highly valuable vehicles like aircraft, ships, rail cars, or the like.

As another example, system 100 may be used in an advertisement targeting application. In this case, user 202 may be an advertiser (e.g., working for a particular provider of goods or services, working for a marketing company, etc.), and system 100 may be used to track the behavior of clients 208 in order to build targeted advertising segments associated with different clients 208. For example, by using system 100 to learn about client behavior at various times of day (e.g., during the workday as well as in the evenings and at night), times of week (e.g., on weekdays as well as weekends), seasons of the year (e.g., summer, winter, holiday seasons, etc.), and so forth, user 202 may be able to successfully target advertising to clients 208 in a way that is valuable to both user 202 and to clients 208. Advertising may be customized, for instance, to align with the interests of different clients 208 so that they do not have to endure advertising that is irrelevant to them but are presented with products and/or services that they may actually wish to investigate or purchase. In some examples, as will be described in more detail below, coupons, offers, specials, etc. may even be presented to clients at opportune times and/or when clients are in opportune locations (e.g., nearby a store with which a coupon or offer is associated, at a store associated with a competitor of the store with which the coupon or offer is associated, etc.).

As yet another example, system 100 may be used in managing a large mobile workforce (e.g., whether or not the workforce is each associated with different vehicles in a fleet of vehicles). In this case, user 202 may be a personnel manager and system 100 may be used to track mobile employees, volunteers, canvassers (e.g., door-to-door salespeople, political campaign volunteers, religious proselytizers, grassroots fundraising representatives, people providing community awareness on a particular topic, etc.) to track, analyze, and ultimately increase the effectiveness of the workforce. For example, based on information provided by system 100, user 202 may be able to provide and test different incentives intended to modify behavior of the workforce, improve the efficiency of the workforce, or the like.

In any of these exemplary applications, or various other applications in which system 100 may be used, it may be desirable for system 100 to not only track mobile devices 204 in real time (e.g., as typically performed by conventional fleet tracking software), but to further manage historical geolocation data that was received in the past. Additionally, it may be desirable for system 100 to not only track mobile devices 204 during certain hours of the day or week (e.g., during working hours when clients 208 are performing assigned shifts), but to also gather information at other times (e.g., all day, every day). Unfortunately, as mentioned above, to track with a high level of granularity (e.g., once per second) may require an active application to be used all the time, and may put a significant strain on the battery life of mobile devices 204 as they constantly use battery power to determine and report their geolocation second by second.

Accordingly, system 100 may be configured to operate with software running in the background on mobile devices 204. For example, reporting software configured to operate together with system 100 may be implemented in a software development kit ("SDK") used to implement one or more applications configured to execute actively and/or in the background by mobile devices 204. Accordingly, even if a particular navigation application or work-related application that relies on second-by-second navigation is not actively executing on a mobile device 204 (e.g., after a shift has concluded), system 100 may still receive geolocation reports sporadically (e.g., once every few minutes or even less often) from the mobile device 204 due to a background process executing on the mobile device 204 using a negligent amount of battery power.

In order to balance the potentially competing goals of 1) tracking geolocation information for a mobile device at a relatively high degree of granularity and 2) using limited resources (e.g., battery life, mobile data, network bandwidth, etc.) of the mobile device and/or a network providing communication with mobile device, system 100 may be configured to operate in accordance with a passive monitoring pattern.

To illustrate, FIGS. 3A through 3D illustrate exemplary passive monitoring patterns 302 (i.e., passive monitoring pattern 302-1 in FIG. 3A, passive monitoring pattern 302-2 in FIG. 3B, passive monitoring pattern 302-3 in FIG. 3C, and passive monitoring pattern 302-4 in FIG. 3D) that may be employed by system 100 in managing historical geolocation data for one or more mobile devices. Each of passive monitoring patterns 302 represent different types of passive monitoring patterns that may serve to help balance the goals of closely tracking geolocation data and conserving resources like battery life in different ways and different contexts (e.g., used by different types of mobile applications, mobile operating systems, etc.). As such, it will be understood that the types of passive monitoring patterns illustrated in FIGS. 3A through 3D are exemplary only, and that other suitable types of passive monitoring patterns may be used in combination with or in place of the types of passive monitoring patterns illustrated in FIGS. 3A through 3D.

Figure 3A:
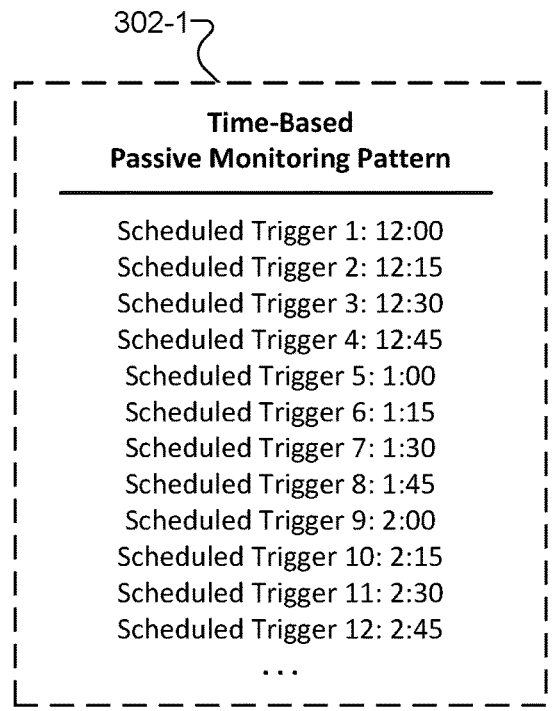
FIGS. 3A through 3D illustrate exemplary passive monitoring patterns that may be employed by the geolocation data management system of FIG. 1 in managing historical geolocation data for a plurality of mobile devices according to principles described herein.

Passive monitoring pattern 302-1 in FIG. 3A illustrates a first type of passive monitoring pattern referred to herein as a time-based passive monitoring pattern. Time-based passive monitoring patterns such as passive monitoring pattern 302-1 may be configured to invoke the mobile device to provide a geolocation in accordance with a predetermined schedule. For example, as shown, a plurality of scheduled triggers (i.e., scheduled triggers 1 through 12 and beyond) may be set to occur every 15 minutes starting at 12:00. In other examples, other schedules may be used. For instance, time-based passive monitoring pattern 302-1 may be used to invoke the mobile device to provide a geolocation once every 10 seconds (e.g., if the mobile device currently has plenty of battery life or is plugged in), once every minute, once every hour (e.g., if the mobile device currently is running low on battery life), or at any other suitable rate as may serve a particular implementation under particular circumstances. While scheduled triggers may occur at regular, repeating intervals as shown in FIG. 3A in certain examples, it will be understood that scheduled triggers may also occur at non-regular intervals or may be scheduled as one-time, non-repeating triggers in other examples.

While mobile operating systems commonly allow timers to be used by active mobile applications to schedule triggers such as those shown in time-based passive monitoring pattern 302-1, certain mobile operating systems may not support such timers to be employed by mobile applications executing in the background (i.e., while another mobile application is actively executing). As such, especially in such mobile operating systems that do not support background timers, it may be desirable for other types of triggers to be employed instead of or in combination with the scheduled triggers shown in FIG. 3A. In this way, a passive monitoring pattern may promote tracking the mobile device at all times (e.g., including when a mobile application providing the geolocations is executing in the background) and for various types of mobile operating systems (e.g., including those that do not support background timers).

Figure 3B:
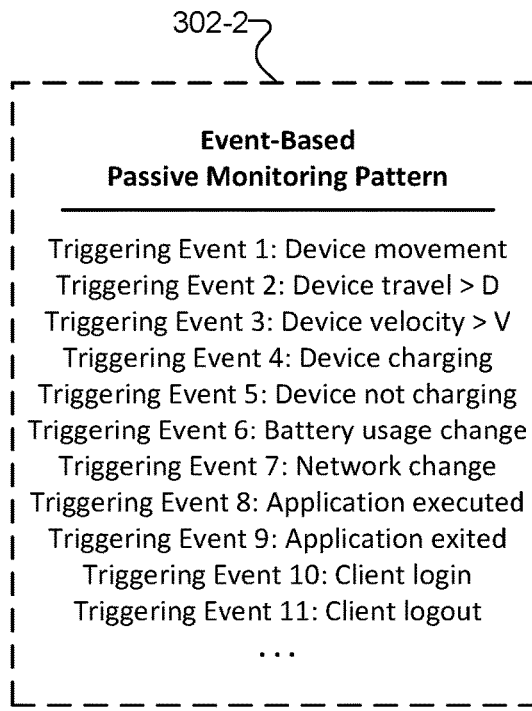

For example, passive monitoring pattern 302-2 in FIG. 3B illustrates a second type of passive monitoring pattern referred to herein as an event-based passive monitoring pattern. Event-based passive monitoring patterns such as passive monitoring pattern 302-2 may be configured to invoke the mobile device to provide a geolocation upon an occurrence of a predetermined triggering event. As shown in FIG. 3B, various types of triggering events may be used for this purpose. Specifically, for example, one triggering event (i.e., "triggering event 1") may include a detection of movement of the mobile device. For example, the mobile device may be detected to move when a movement sensor (e.g., an accelerometer, etc.) detects a threshold amount of movement (e.g., a certain degree of movement, movement for a threshold amount of time, etc.). Similarly, another triggering event (i.e., "triggering event 2") may include a detection that the mobile device has moved at least a threshold amount by determining that a geolocation of the mobile device has changed from a previously detected geolocation by at least a threshold distance "D," while yet another triggering event (i.e., "triggering event 3") may include a detection that the mobile device has accelerated up to a particular threshold velocity "V". In still other examples (not explicitly shown) a threshold velocity may be an upper bound and a triggering event may include a detection that the mobile device has slowed down to below the threshold velocity.

Other exemplary triggering events may relate to battery life of the mobile device. For instance, one triggering event (i.e., "triggering event 4") may include a detection that the mobile device has been plugged in and is charging, another triggering event (i.e., "triggering event 5") may include a detection that the mobile device has been unplugged and is no longer charging, and yet another triggering event (i.e., "triggering event 6") may include a detection that the battery usage of the mobile device has undergone a change. For instance, the change may include the battery life being charged up to a threshold, the battery life slipping below a threshold, or a change to how fast the battery life is being consumed (e.g., when a power-intensive operation unrelated to geolocation tracking is started or stopped). Other changes to other aspects of mobile device operation besides battery life may also be used as triggering events. For instance, a triggering event (i.e. "triggering event 7") may include a detection that an aspect of a network to which the mobile device is connected has changed. For example, triggering event 7 may be invoked whenever the mobile device switches from one cell tower to another, from one wireless network (e.g., Wi-Fi network) to another, or the like.

Still other exemplary triggering events may relate to mobile applications executing on the mobile device, clients logging into or out of the mobile device, and/or other mobile device operations that may or may not have a direct relationship with any mobile application providing the geolocation data upon detecting the triggering events. For example, one triggering event (i.e., "triggering event 8") may include a detection that an application is executing, or has been selected to begin executing. In some implementations, this triggering event may occur when any new application is started, while in other implementations, this triggering event may occur only when one or more particular applications are detected to begin execution. As another example, another triggering event (i.e., "triggering event 9") may include a detection that an application (e.g., any application or a particular application) stops executing, or is switched from an active execution mode to a background execution mode. Additionally, another triggering event (i.e., "triggering event 10") may include a detection that a client (e.g., any client or one or more particular clients) has logged in to use the mobile device or to operate a particular mobile application, while still another triggering event (i.e., "triggering event 11") may include a detection that a client has logged out of the mobile device or the particular mobile application.

It will be understood that, while all of the triggering events represented in event-based passive monitoring pattern 302-2 (e.g., as well as other suitable triggering events not explicitly shown) may be employed in certain implementations, in other implementations, only one or a subset of triggering events 1 through 11 and/or other suitable triggering events may be employed in an event-based passive monitoring pattern. Additionally, certain triggering events may consist of logical combinations of events (e.g., other triggering events). For example, certain triggering events 1 through 11 may be combined using logical operators (e.g., AND operators, OR operators, NAND operators, NOR operators, XOR operators, etc.) to create additional triggering events.

Figure 3C:
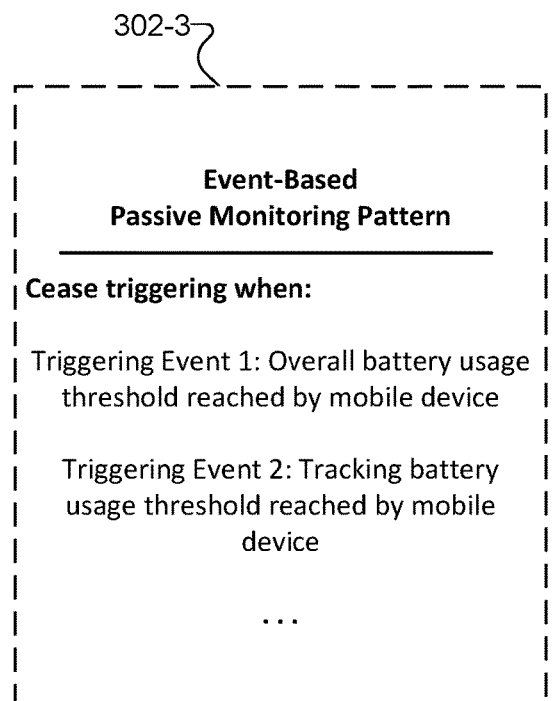

While the triggering events described above in relation to event-based passive monitoring pattern 302-2 may generally be used to evoke the mobile device to detect and report its geolocation, these or other triggering events may also be used, in certain implementations, to invoke the mobile device to cease detecting and/or reporting its geolocation. For example, FIG. 3C shows an event-based passive monitoring pattern 302-3 that is configured to invoke the mobile device to cease providing the plurality of geolocations upon an occurrence of a predetermined triggering event relating to battery usage. Such triggering events may be referred to herein as battery usage events, and, as shown, may be implemented by a triggering event (i.e., "triggering event 1") including a detection that a predetermined overall battery usage threshold has been reached by the mobile device, a triggering event (i.e., "triggering event 2") including a detection that a predetermined tracking battery usage threshold has been reached by the mobile device, or the like.

Specifically, for example, it may be desirable to monitor the geolocation of a mobile device every ten minutes as long as the overall battery usage is less than a threshold amount such as 80% in one example (i.e., as long as the overall battery life remains greater than 20%). At that point, it may be desirable to cease triggering geolocation reporting altogether, or at least to cease (i.e., cancel) certain scheduled geolocation reporting (e.g., by reducing the frequency of reports to once every twenty minutes, once every thirty minutes, etc.).

As another example, it may be desirable to monitor the geolocation of the mobile device every ten minutes as long as the battery power expended by location tracking operations performed by the mobile device (e.g., the operations of determining and/or reporting the geolocation of the mobile device) remains below a certain threshold level referred to herein as a tracking battery usage threshold to distinguish it from the overall battery usage threshold. For instance, one or more triggering events may be set up to apply a rule that location tracking operations are to consume no more than 4% of the total battery power between charges in one example, that location tracking operations are to be reduced once they have consumed at least 2% of the total battery life, or the like.

Figure 3D:
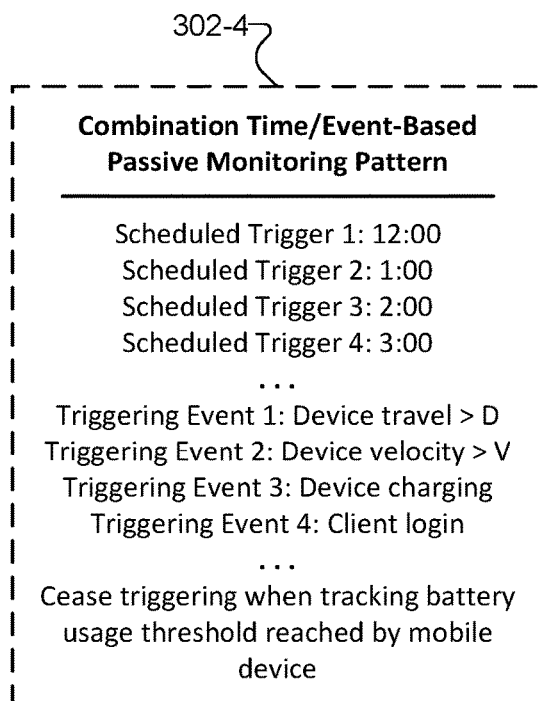

In some examples, various types of triggers may be combined into one combination time/event-based passive monitoring pattern such as combination passive monitoring pattern 302-4 shown in FIG. 3D. Combination passive monitoring pattern 302-4 combines different types of triggers to create a passive monitoring pattern that is guaranteed to invoke the mobile device to provide its geolocation at least once an hour (e.g., even during the night when the client of the mobile device may be asleep and the mobile device may be stationary) due to hourly scheduled triggers, while also invoking geolocation reports upon the occurrence of certain events (e.g., the mobile device traveling beyond a threshold distance, reaching a threshold velocity, being plugged in to charge, and the client logging in), and ceasing reporting when a tracking battery usage threshold is reached. In this way, combination passive monitoring pattern 302-4 may provide certain benefits from each of the different types of passive monitoring patterns 302-1 through 302-3 to provide maximum flexibility to system 100 in tracking the mobile device and striking the proper balance between close tracking and conserving resources.

In some examples, passive monitoring patterns 302 may be manually set for a mobile device 204 by a person such as user 202 or the respective clients 208 using the mobile device 204, while, in other examples, passive monitoring patterns 302 may be automatically set for the mobile device 204 by a system or device such as system 100 or the mobile device 204 itself. Accordingly, system 100 may identify the passive monitoring pattern for a particular mobile device 204 in different ways in different situations. For instance, in one example, system 100 may identify the passive monitoring pattern by receiving input from user 202 representative of the passive monitoring pattern (e.g., by way of a user interface presented by system 100). In another example, system 100 may identify the passive monitoring pattern by accessing data representative of the passive monitoring pattern from the mobile device 204 (which itself may have automatically established the passive monitoring pattern or may have received input from the client 208 representative of the passive monitoring pattern). And, in yet another example, system 100 may identify the passive monitoring pattern by establishing (e.g., automatically establishing) the passive monitoring pattern itself.

When the passive monitoring pattern is identified by receiving user input from user 202 or by establishing the passive monitoring pattern directly, system 100 may determine the plurality of geolocations in accordance with the passive monitoring pattern by directing the mobile device 204 to provide the plurality of geolocations in accordance with the passive monitoring pattern received or established by system 100, and by then receiving the provided plurality of geolocations from the mobile device 204 in accordance with the passive monitoring pattern. In some examples, the passive monitoring pattern may be set to be the same for all the mobile devices 204, while, in other examples, the passive monitoring pattern may be set to be different for each mobile device 204 to correspond to particular circumstances or characteristics of each passive monitoring pattern (e.g., different overall battery usages, different mobile applications executing on the mobiles devices, different mobile operating systems used on the mobile devices, etc.).

In some implementations, passive monitoring patterns 302 may be statically set (i.e., so as to never change or to only change under relatively rare circumstances). For instance, for a particular mobile device 204, user 202 or a respective client 208 may manually select a static passive monitoring pattern for the mobile device 204, or system 100 or the mobile device 204 itself may automatically set such a static passive monitoring pattern.

In other implementations, passive monitoring patterns 302 may be dynamically reconfigurable. For example, after being manually or automatically set by user 202, the client 208, system 100, or mobile devices 204 themselves, the passive monitoring pattern may be manually or automatically altered by any of these people, systems, or devices. In this way, the passive monitoring pattern may serve to flexibly and dynamically manage the balance between the competing goals of closely tracking geolocation data and conserving resources in any manner as may serve a particular implementation.

In examples in which passive monitoring patterns are automatically set and/or dynamically reconfigured by a machine such as system 100 or a mobile device 204, the passive monitoring patterns may be set or modified based on any suitable factors. For example, such factors may include a reported battery usage (or battery life) of the mobile device, a reported movement pattern (e.g., a current velocity or the like), a network usage of the mobile device, and/or any other factors as may serve a particular implementation. As such, the identifying of the passive monitoring pattern to be used by a mobile device may include determining at least one of a real-time reported battery usage of the mobile device and a real-time reported movement pattern of the mobile device, and automatically establishing the passive monitoring pattern based on the determined the real-time reported battery usage and/or real-time reported movement pattern.

In some examples, this automatically established passive monitoring pattern may correspond to a monitoring mode in a plurality of preconfigured monitoring modes associated with a characteristic of the mobile device. For example, the characteristic may relate to the real-time reported battery usage of the mobile device and the preconfigured monitoring modes may relate to different frequencies at which the geolocations are to be determined and reported (e.g., a higher frequency to be used when the battery usage is lower, a lower frequency to be used when the battery usage is higher, etc.). As another example, the characteristic may relate to the real-time reported movement pattern of the mobile device and the preconfigured monitoring modes may relate to different distances at which the geolocations are to be determined and reported (e.g., closer together when traveling at a low speed mode, further apart when traveling at a high speed, etc.).

As each geolocation is determined and reported by a particular mobile device 204, system 100 may determine the geolocations (e.g., based on the reports made by the mobile device 204 such as by accessing or receiving the geolocations from the mobile device 204) and generate a plurality of geolocation records for the mobile device. These geolocation records may take any form and may be stored and used as historical geolocation data in any manner as may serve a particular implementation. For example, each geolocation record in the plurality of geolocation records that system 100 generates may include a timestamped coordinate set reported by the mobile device 204 for a different one of the plurality of geolocations of the mobile device 204 as the mobile device 204 traverses the path. Moreover, system 100 may perform a reverse geocoding operation to determine a point of interest corresponding to one or more of the geolocations in the plurality of reported geolocations. For instance, in response to determining that the mobile device dwelled at a particular geolocation for a time interval of at least a predetermined amount of time, system 100 may determine a point of interest corresponding to the particular geolocation. This point of interest may also be included within the geolocation record (e.g., along with the timestamped coordinate set), or may be included within a dwell record as will be described in more detail below.

As used herein, a point of interest may include any named entity such as a retailer or other place of business, a government building, a park, a home or neighborhood, a church, or any other named entity associated with a particular location on a map and that may be of interest to clients using the map (e.g., that may be searched for by the clients, routed to by the clients, visited by the clients, etc.). System 100 may perform reverse geocoding to determine a point of interest associated with a timestamped coordinate set in any manner as may serve a particular implementation. For example, if a geolocation (e.g., a timestamped coordinate set representative of the geolocation) reported by the mobile device 204 points to a location that directly corresponds to a known point of interest, that point of interest may be associated with the geolocation report. In other examples, if a geolocation reported by the mobile device 204 does not directly correspond to any known point of interest (e.g., but, rather, is positioned near a known point of interest, such as on the street in front of the known point of interest), system 100 may associate this known point of interest with the geolocation report.

Figure 4:
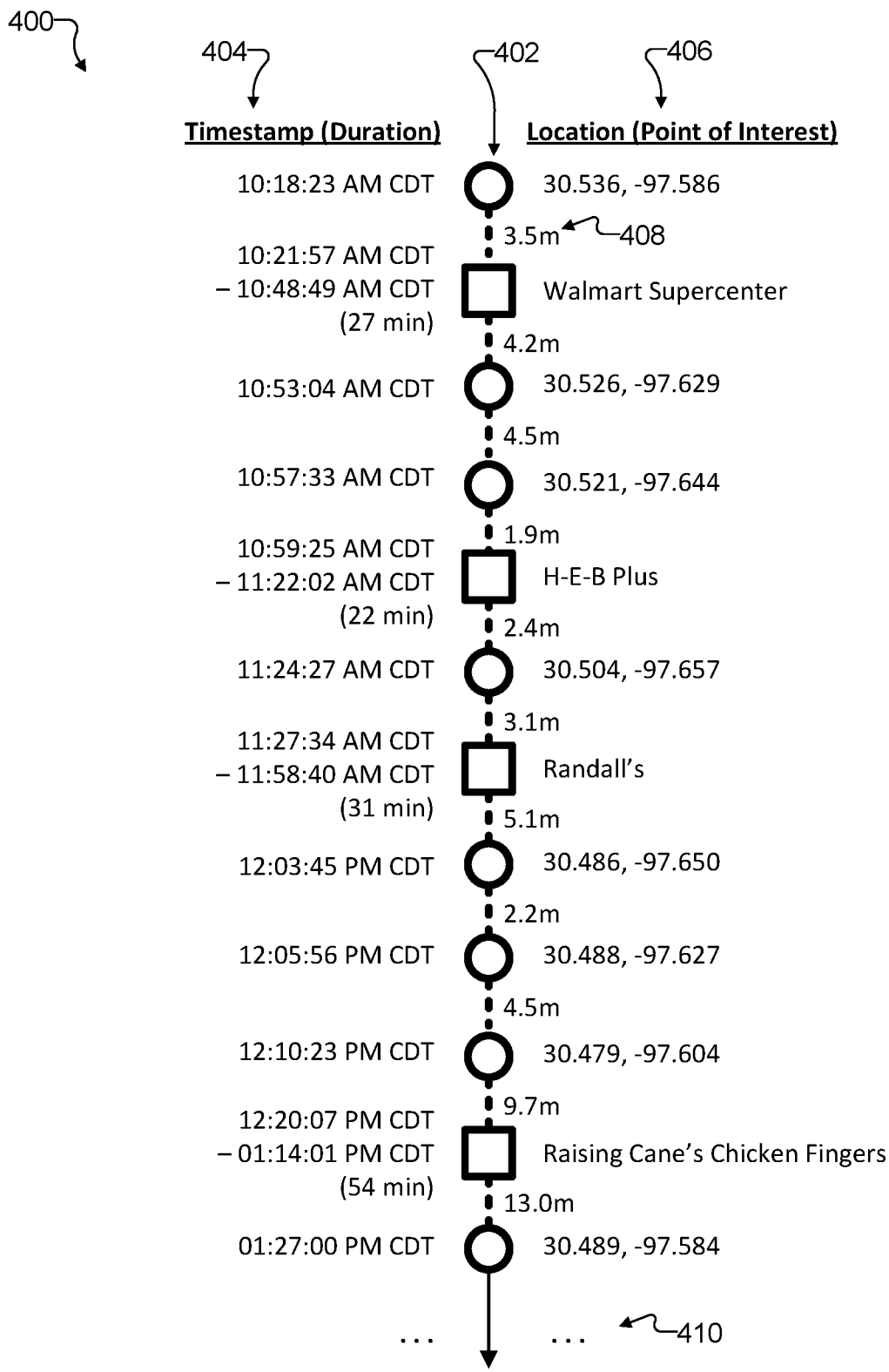
FIG. 4 illustrates a representation of an exemplary path traversed by a mobile device during a time period according to principles described herein.

To illustrate exemplary geolocation records and dwell records generated by system 100 based on reported geolocations from a particular mobile device 204, FIG. 4 shows a path representation 400 of an exemplary path traversed by the mobile device 204 during an exemplary time period. Specifically, a plurality of records each associated with a record icon 402 each include a timestamp 404 and a location 406, and are connected together with links 408 to show the order the records were generated during the time period. While the time period represented by path representation 400 is shown to begin at 10:18:23 AM CDT and to run through until 1:27:00 PM CDT, it will be understood that additional records (e.g., represented by ellipsis 410) may further be included along the path traversed in the time period represented by path representation 400 (e.g., either prior to or after the records explicitly illustrated). For example, as will be illustrated in more detail below, if path representation 400 is presented to a user by way of a user interface, the user may be able to scroll up and down to examine the entirety of path representation 400 (which may, for example, cover a day, a week, etc.).

As shown, each record icon 402 may indicate a record type (i.e., whether the icon represents a geolocation record or a dwell record) based on a shape of the record icon 402. For example, circular record icons 402 may represent geolocations that have been reported, but where the mobile device 204 was not detected to have dwelled. Circular record icons 402 may represent, for instance, geolocations where the client 208 carrying the mobile device 204 merely passed through but did not remain for a significant amount of time (e.g., remained for less than the predetermined amount of time required to generate a dwell record). In contrast, square record icons 402 may represent geolocations where the mobile device 204 has not only been detected to have traversed, but where the mobile device 204 has been detected to have dwelled (e.g., remained for at least the predetermined amount of time). As will be described in more detail below, square record icons 402 may incorporate a geolocation record that system 100 has determined (based on an analysis of a plurality of contiguous geolocation records) represents a location where the client 208 dwelled. In certain examples, square record icons 402 may represent dwell records that incorporate a plurality of similar geolocation records.

Timestamps 404 associated with geolocation records (i.e., next to circular record icons 402) are shown to indicate moments in time such as 10:18:23 AM CDT, 10:53:04 AM CDT, and so forth, while timestamps 404 associated with dwell records (i.e., next to square record icons 402) are shown to be implemented by what are referred to herein as "interval timestamps." Interval timestamps represent time intervals or ranges of time during which the mobile device 204 dwelled at the respective location 406. For example, as shown, exemplary interval timestamps associated with dwell records in path representation 400 include 10:21:57 AM CDT-10:48:49 AM CDT (i.e., where the mobile device 204 was detected to dwell at "Walmart Supercenter") and 10:59:25 AM CDT-11:22:02 AM CDT (i.e., where the mobile device 204 was detected to dwell at "H-E-B Plus"). Additionally, each interval timestamp 404 may be associated with a duration (e.g., "27 minutes," "22 minutes," etc.) that may further be included within the respective dwell record, as shown.

Locations 406 may include coordinate sets, points of interest (e.g., that have been reverse geocoded from a coordinate set in any of the ways described herein), or both. For example, as shown in path representation 400, the geolocation records associated with circular record icons 402 may each be associated with a location 406 implemented by a coordinate set (i.e., a pair of latitude/longitude coordinates indicative of the precise geolocation). The first geolocation record shown in path representation 400, for instance, includes a coordinate set with coordinates "30.536, −97.586." Meanwhile, as further illustrated, dwell records associated with square record icons 402 may each be associated with a location 406 that is implemented by a reverse-geocoded point of interest. For instance, as mentioned above, the first dwell record illustrated in path representation 400 includes a location 406 implemented by a point of interest called "Walmart Supercenter."

System 100 may determine that a mobile device 204 dwells at a particular geolocation for a particular time interval based on a contiguous subset of geolocation records in any manner as may serve a particular implementation. For instance, two exemplary ways of detecting that a dwell has occurred and generating a dwell record representative of the detected dwell are illustrated in FIG. 5 and FIG. 6.

Figure 5:
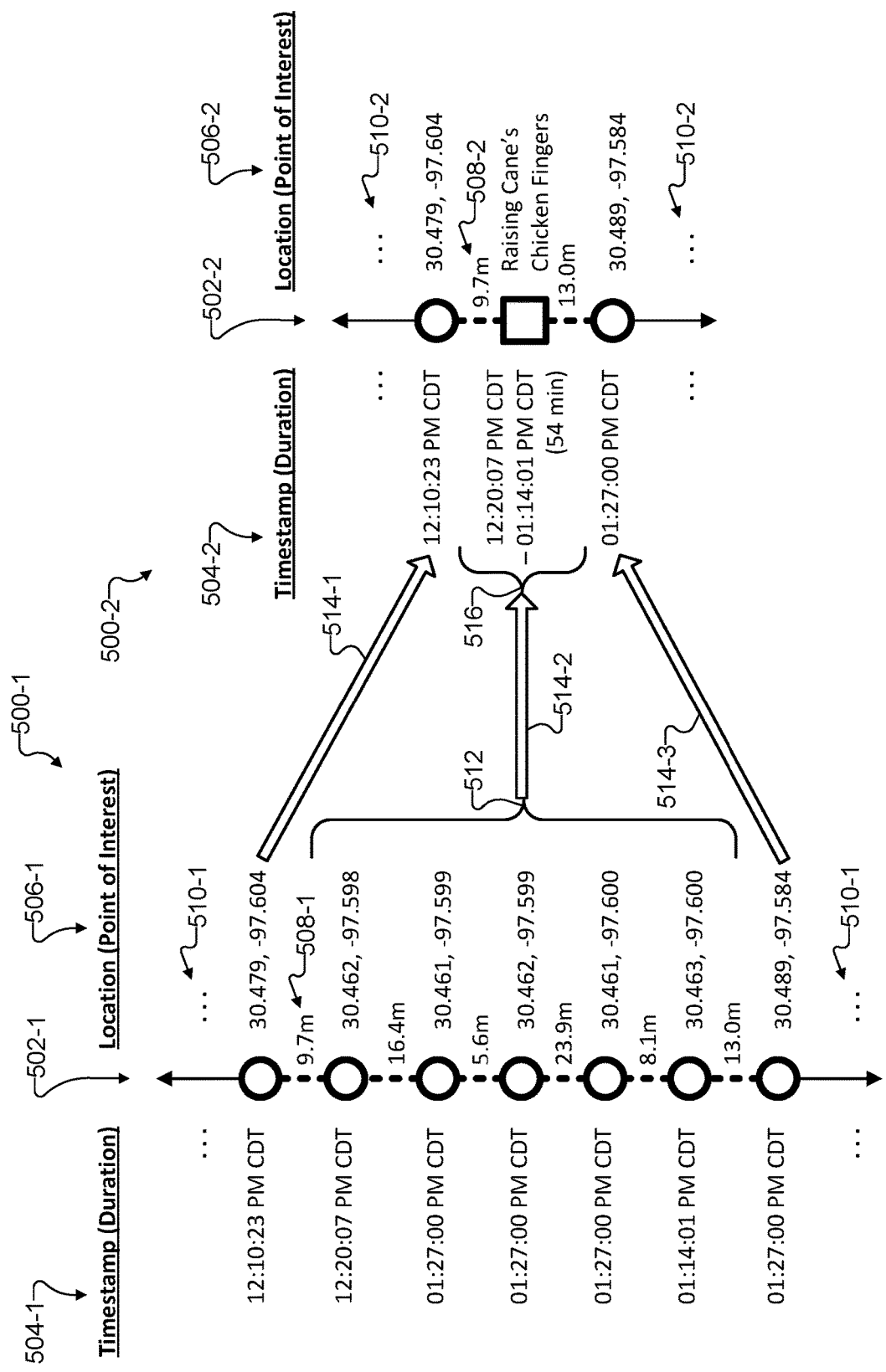
FIGS. 5 and 6 illustrate exemplary aspects of the generation of exemplary dwell records based on geolocations records reported by a mobile device according to principles described herein.
Figure 6:
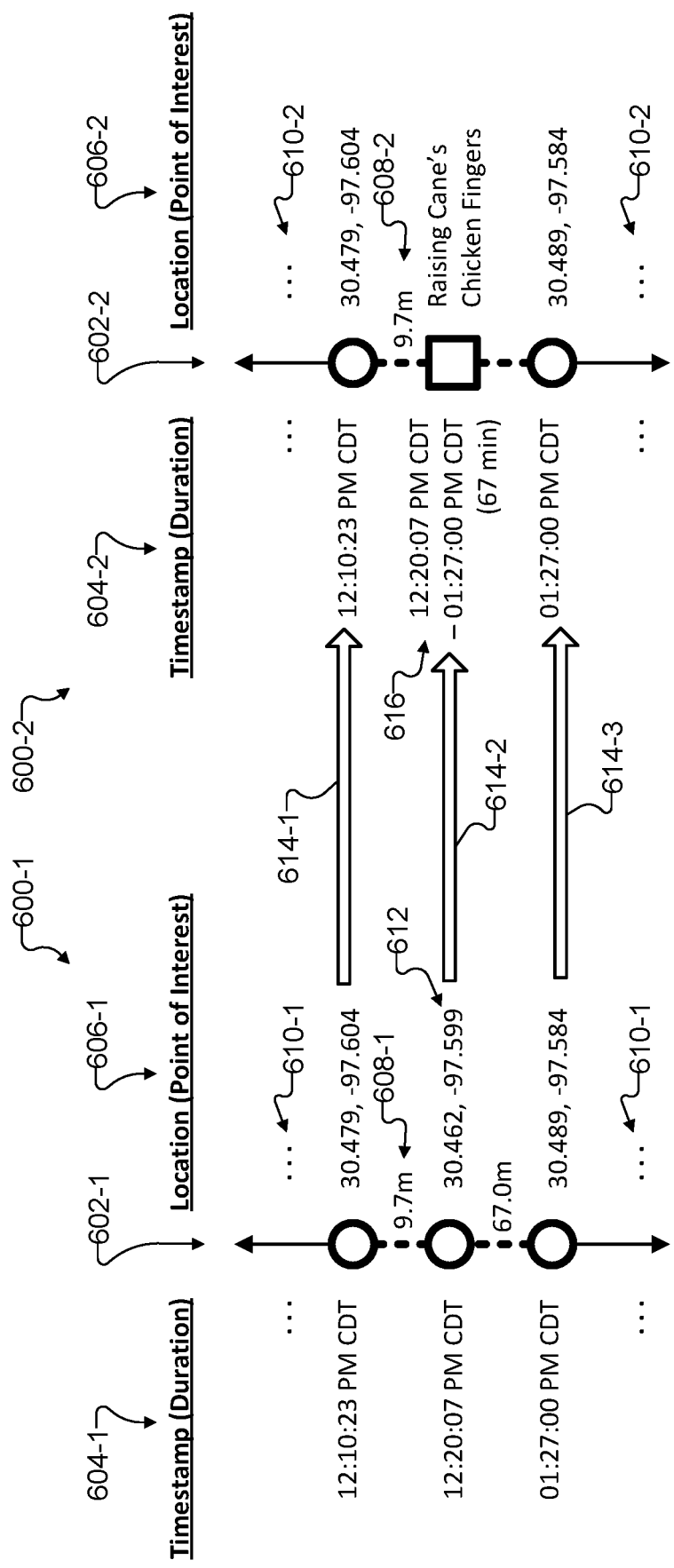

FIG. 5 illustrates an exemplary dwell record and exemplary aspects of the generation of the dwell record based on a contiguous plurality of similar geolocations records reported by a mobile device. Specifically, a path representation 500-1 of a reported path traversed by the mobile device is shown to include a plurality of geolocation records each associated with a circular record icon 502-1, a respective timestamp 504-1, and a location 506-1 consisting of a coordinate set. As with FIG. 4 above, each of the record icons 502-1 in path representation 500-1 are connected together to form the path by links 508-1 that indicate a passage of time between geolocation records. Also, additional geolocation records represented by ellipsis 510-1 will be understood to precede and/or follow the geolocation records explicitly shown in path representation 500-1.

Also shown in FIG. 5 is a path representation 500-2 of the same reported path traversed by the mobile device. Path representation 500-2 includes similar features as path representation 500-1, which are labeled with similar reference numbers (i.e., ending with "-2" rather than "-1"). Specifically, path representation 500-2 illustrates a plurality of records (i.e., two geolocation records and a dwell record) each associated with a respective record icon 502-2 (i.e., circular records icons for the geolocation records and a square record icon for the dwell record), a respective timestamp 504-2 (i.e., momentary timestamps associated with the geolocation records and an interval timestamp associated with the dwell record), a respective location 506-2 (i.e., coordinate sets associated with the geolocation records and a point of interest associated with the dwell record), and respective links 508-2 connecting the record icons 502-2 together. Additionally, path representation 500-2 includes two ellipsis 510-2 to represent additional records that are not explicitly shown but will be understood to be reported before and/or after those shown in path representation 500-2.

As shown, a contiguous subset 512 of the geolocation records illustrated in path representation 500-1 may be determined to each be at or near a single geolocation. Specifically, as shown by the respective coordinate sets of the geolocation records in subset 512, each of these geolocation records may be at or within a predetermined distance of coordinates "30.462, −97.599." For example, each of the respective coordinate sets of these geolocation records may be located within a predetermined distance of "±0.001, ±0.001" of the coordinate set "30.462, −97.599." Because the geolocation records in subset 512 are each associated with a sufficiently similar location (i.e., the geolocation found at "30.462, −97.599"), system 100 may determine, based on subset 512, that the mobile device dwelled at this location for a time interval spanning the time from at least the first geolocation record in the subset until the last geolocation record in the subset (i.e., from 12:20:07 PM CDT until 1:14:01 PM CDT). Accordingly, as shown by arrows 514 (i.e., arrows 514-1 through 514-3), which illustrate equivalency relationships between records in path representations 500-1 and 500-2, system 100 may keep geolocation records that do not align with other contiguous geolocation records separated from one another, while consolidating the aligned geolocation records in subset 512 into a single dwell record 516. Specifically, as shown, dwell record 516 includes a square record icon 502-2, an interval timestamp 504-2 including a duration (i.e., 54 minutes), and a location 506-2 shown as a point of interest (i.e., "Raising Cane's Chicken Fingers," a fast food restaurant located at coordinates "30.462, −97.599").

FIG. 5 illustrates an exemplary way of detecting that a dwell has occurred based on a contiguous plurality of similar geolocation records (i.e., geolocation records each associated with approximately the same location). This may be useful, for example, in detecting a dwell when a passive monitoring pattern is used that continually invokes the mobile device to provide geolocation reports periodically even when the mobile device is relatively stationary (e.g., dwelling within a particular point of interest). However, certain passive monitoring patterns may not continually invoke the mobile device to provide geolocation reports when the mobile device remains so stationary in this way. For example, if a passive monitoring pattern only invokes the mobile device to provide geolocation information when traveling at a certain velocity, moving a certain distance from a previous geolocation, or the like, a contiguous plurality of similar geolocation records such as those in subset 512 may not be reported, and, thus, a dwell may not be detectable by system 100 in this way.

Accordingly, FIG. 6 illustrates another exemplary way of detecting that a dwell has occurred based on a contiguous pair of geolocation records that are located a disproportionate distance from one another based on their respective timestamps. The idea illustrated in FIG. 6 is that if a mobile device is detected to move a relatively short distance over a relatively long period of time, system 100 may infer that the mobile device dwelled at a location associated with the geolocation records for at least part of the long period of time.

Specifically, a path representation 600-1 of a reported path traversed by a mobile device is shown to include a plurality of geolocation records each associated with a circular record icon 602-1, a respective timestamp 604-1, and a location 606-1 consisting of a coordinate set. As with FIGS. 4 and 5 above, each of the record icons 602-1 in path representation 600-1 are connected together to form the path by links 608-1 that indicate a passage of time between geolocation records. Also, additional geolocation records represented by ellipsis 610-1 will be understood to precede and/or follow the geolocation records explicitly shown in path representation 600-1.

Further shown in FIG. 6 is a path representation 600-2 of the same reported path traversed by the mobile device. Path representation 600-2 includes similar features as path representation 600-1, which are labeled with similar reference numbers (i.e., ending with "-2" rather than "-1"). Specifically, path representation 600-2 illustrates a plurality of records (i.e., two geolocation records and a dwell record) each associated with a respective record icon 602-2 (i.e., circular records icons for the geolocation records and a square record icon for the dwell record), a respective timestamp 604-2 (i.e., momentary timestamps associated with the geolocation records and an interval timestamp associated with the dwell record), a respective location 606-2 (i.e., coordinate sets associated with the geolocation records and a point of interest associated with the dwell record), and respective links 608-2 connecting the record icons 602-2 together. Additionally path representation 500-2 includes two ellipsis 610-2 to represent additional records that are not explicitly shown but will be understood to be reported before and/or after those shown in path representation 600-2.

As shown, no contiguous subset of geolocation records illustrated in path representation 600-1 is reported to be at or near a single geolocation as was the case in FIG. 5. However, as shown by the respective coordinate sets of the second and third geolocation records in path representation 600-1, a relatively short distance (i.e., from coordinate "30.462, −97.599" to coordinate "30.489, −97.584", a distance of approximately two miles) is reported to have taken 67.0 minutes to traverse. Based on previous time intervals recorded between geolocations of similar distances apart, 67.0 minutes may be determined to be an abnormally long amount of time to travel two miles (e.g., because the client carrying the mobile device may be driving in a vehicle rather than walking on foot). For example, if previous geolocation reports indicate that it typically takes between four and twelve minutes for the mobile device to traverse two miles, system 100 may determine that any amount of time greater than a predetermined threshold amount of time (e.g., greater than twelve minutes, fifteen minutes, etc.) indicates that the mobile device has stopped to dwell at a particular location, rather than just passing through.

Based on the relatively sparse information provided in the two geolocation records, it may not be possible for system 100 to identify with perfect accuracy where the mobile device dwelled during the period of time (e.g., during the 67.0 minutes). However, it still may be desirable for system 100 to provide a "best guess" about approximately where the user dwelled and for how long. Accordingly, based on these geolocation records, system 100 may determine that the mobile device dwelled at the location of the first geolocation record (i.e., at "30.462, −97.599") for a time interval spanning the time from the first geolocation record until the subsequent geolocation record (i.e., from 12:20:07 PM CDT until 1:27:00 PM CDT). In other examples, the time interval may attempt to account for an average amount of time to traverse the distance between the two locations and the dwell time interval may be less (e.g., from 12:20:07 PM CDT until 01:17:00 PM CDT to account for an average of ten minutes that the mobile device typically takes to travel two miles).

Accordingly, as shown by arrows 614 (i.e., arrows 614-1 through 614-3), which illustrate equivalency relationships between records in path representations 600-1 and 600-2, system 100 may keep geolocation records that are not determined to be associated with dwells as geolocation records (e.g., having circular record icons 602-2), while converting a geolocation record 612 that is determined to be associated with a dwell into a dwell record 616. Specifically, as shown, dwell record 616 includes a square record icon 602-2, an interval timestamp 604-2 including a duration (i.e., 67 minutes), and a location 606-2 shown as a point of interest (i.e., "Raising Cane's Chicken Fingers").

Returning to FIG. 4, the path illustrated in path representation 400 shows a route taken by a client 208 carrying a mobile device 204 at a particular time of day. In particular, for exemplary purposes, a scenario is illustrated that shows an exemplary food delivery vehicle (e.g., a bakery delivery vehicle, a soda delivery vehicle, or the like) performing a delivery route in which a product is delivered to several grocery stores over the course of a late morning and an early afternoon. Specifically, the delivery route includes stops (i.e., also referred to herein as "dwells") at grocery stores including a Walmart Supercenter, an H-E-B Plus, and a Randall's, as well as a lunch stop at the fast food restaurant Raising Cane's Chicken Fingers.

Figure 7:
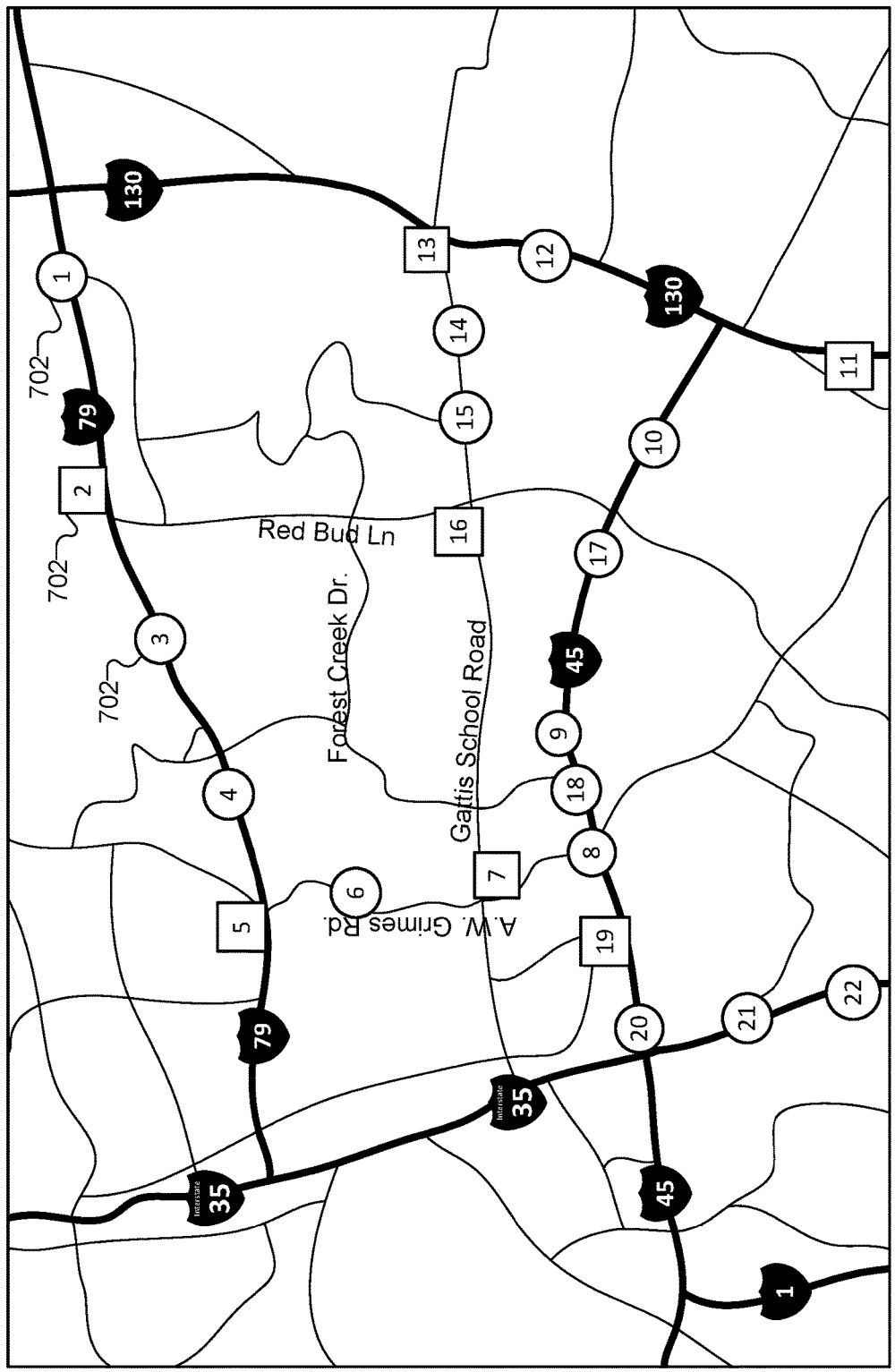
FIG. 7 illustrates an exemplary map indicating the path traversed by the mobile device as represented in FIG. 4 according to principles described herein.

To further illustrate this path, FIG. 7 shows an exemplary map 700 indicating the path traversed by the mobile device 204 as represented by path representation 400 in FIG. 4 (including certain geolocation records not explicitly shown in FIG. 4 due to space limitations but implied by ellipsis 410). Map 700 shows record icons 702 placed along a path traversed by the mobile device 204. As shown, the path includes highways, interstates, other streets, and various points of interest. On map 700, circular record icons 702 represent geolocations that the mobile device 204 passed through without a detected dwell, while square record icons 702 represent geolocations associated with points of interest where the mobile device 204 was determined to have dwelled.

In FIG. 7, each record icon 702 is labeled with a number (e.g., "1" through "22") that corresponds to the order shown in path representation 400 of FIG. 4. Thus, as shown, the path of the mobile device 204 represented by path representation 400 and illustrated on map 700 starts at a geolocation labeled "1" on Highway 79, continues to a Walmart Supercenter labeled "2" where a dwell is detected, continues to other geolocations on Highway 79 labeled "3" and "4" before arriving at an H-E-B Plus labeled "5" where another dwell is detected, and continues to a geolocation labeled "6" along a street called "A. W. Grimes Rd." before dwelling at a Randall's point of interest labeled "7." After the dwell at Randall's, geolocations labeled "8," "9," and "10," are detected along A. W. Grimes Rd. and Highway 45 as the path moves to Raising Cane's Chicken Fingers along Highway 130, where a dwell labeled "11" is detected. From there, the path continues up Highway 130 to a geolocation labeled "12" and the mobile device 204 dwells at a point of interest labeled "13" before turning onto a street called Gattis School Road where geolocations labeled "14" and "15" are traversed before the mobile device 204 is detected to dwell at another point of interest labeled "16." The path of the mobile device 204 appears to then traverse Red Bud Ln. back to Highway 45 where geolocations labeled "17" and "18" are detected before the mobile device 204 arrives at a point of interest labeled "19" where the mobile device 204 dwells before continuing on Highway 45 to Interstate 35 and traveling down beyond the scope of map 700 with geolocations detected at points labeled "20," "21," and "22."

As will be illustrated in more detail below, system 100 may generate and provide a map such as map 700 to depict historical geolocation data for a single mobile device 204. Additionally, in some examples, system 100 may be configured to generate and provide a map representative of geolocation data for a plurality of mobile devices 204. In some implementations, it may be confusing and/or may seem cluttered to display historical geolocation data associated with a large number of respective mobile device paths on a single map, thus making it preferable to display, for instance, one or a small number of paths at a time for selected mobile devices (e.g., potentially using different colors or shapes or the like to represent different mobile device paths). However, in implementations configured to provide not only historical geolocation data but also real-time geolocation data, it may be desirable to depict real-time geolocation data for a larger number of mobile devices 204 (e.g., each associated with a different vehicle in a fleet being managed by fleet management software) at once on the same map.

Figure 8:
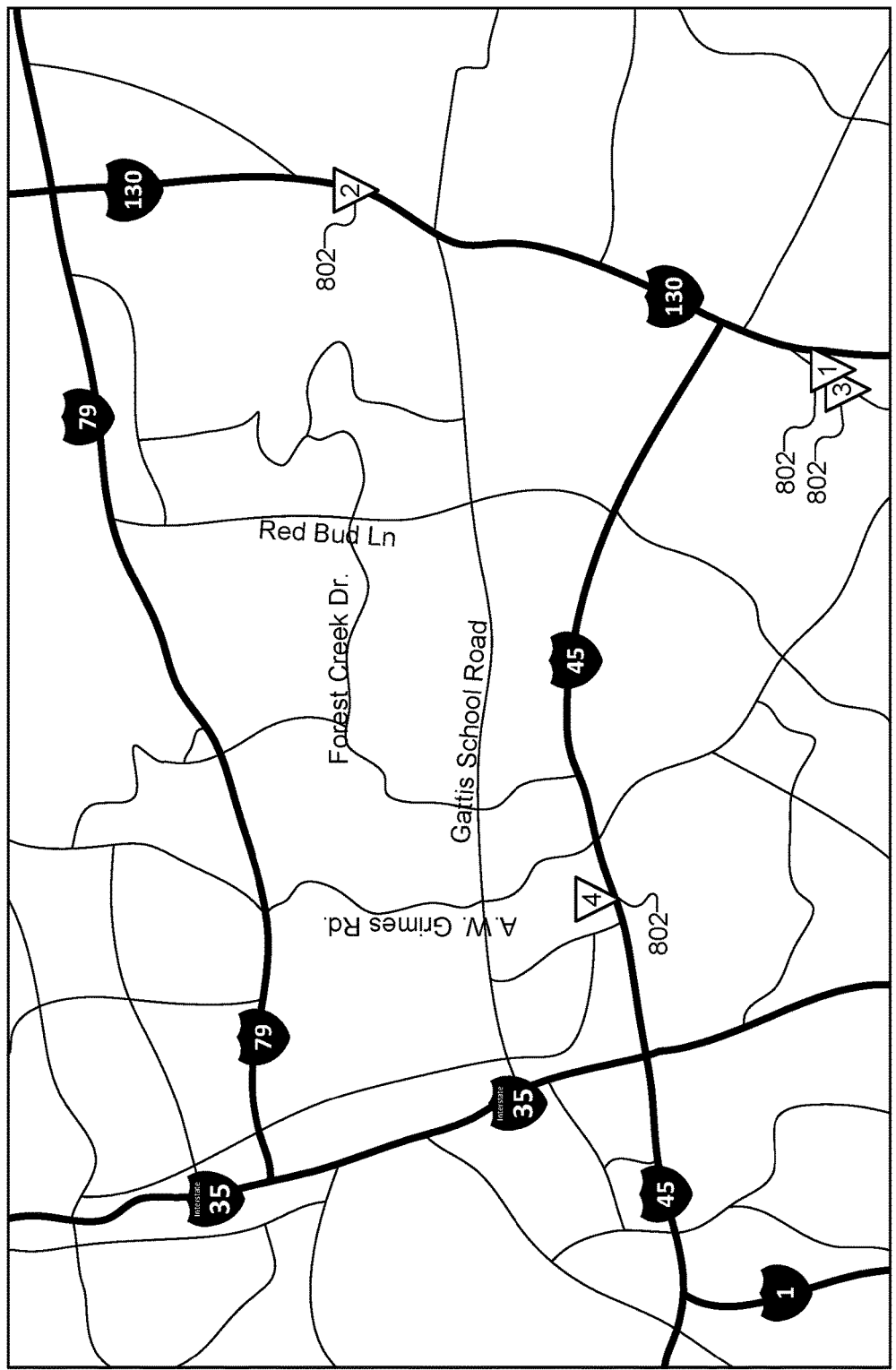
FIG. 8 illustrates an exemplary map indicating real-time locations of a plurality of mobile devices according to principles described herein.

To illustrate, FIG. 8 shows an exemplary map indicating real-time locations 802 of a plurality of mobile devices. For example, around lunch time, several clients 208 associated with respective mobile devices 204 may agree to meet for lunch and may be tracked as they move toward and congregate at the agreed upon location (e.g., the Raising Cane's Chicken Fingers restaurant in this example). While many benefits described above relate to historical geolocation data detected by system 100, it will be understood that additional benefits may be further provided by system 100 that relate to real-time geolocation data. For example, by detecting that each of the mobile devices 204 are moving toward a particular point of interest, system 100 may provide advertisements and/or offers (e.g., deals, coupons, etc.) in real time to entice clients 208 to perform certain behaviors. For example, an offer associated with Raising Cane's Chicken Fingers may be provided to all four mobile devices in real time once all four have met at the particular restaurant location as an incentive to make this particular restaurant the selected meeting spot for the clients to eat lunch. In other examples, historical geolocation data may be combined with real-time geolocation data to provide special deals to those who have visited the point of interest often, or to entice them to do so. In still other examples, competitors near a favorite point of interest that several clients 208 are detected to visit often (e.g., a Chipotle Mexican Grill restaurant located next door to the Raising Cane's Chicken Finger restaurant) may provide targeted advertisements and offers to attempt to entice the group of clients 208 to try their points of interest instead of or in addition to those that the clients 208 are already known to visit often.

Figure 9:
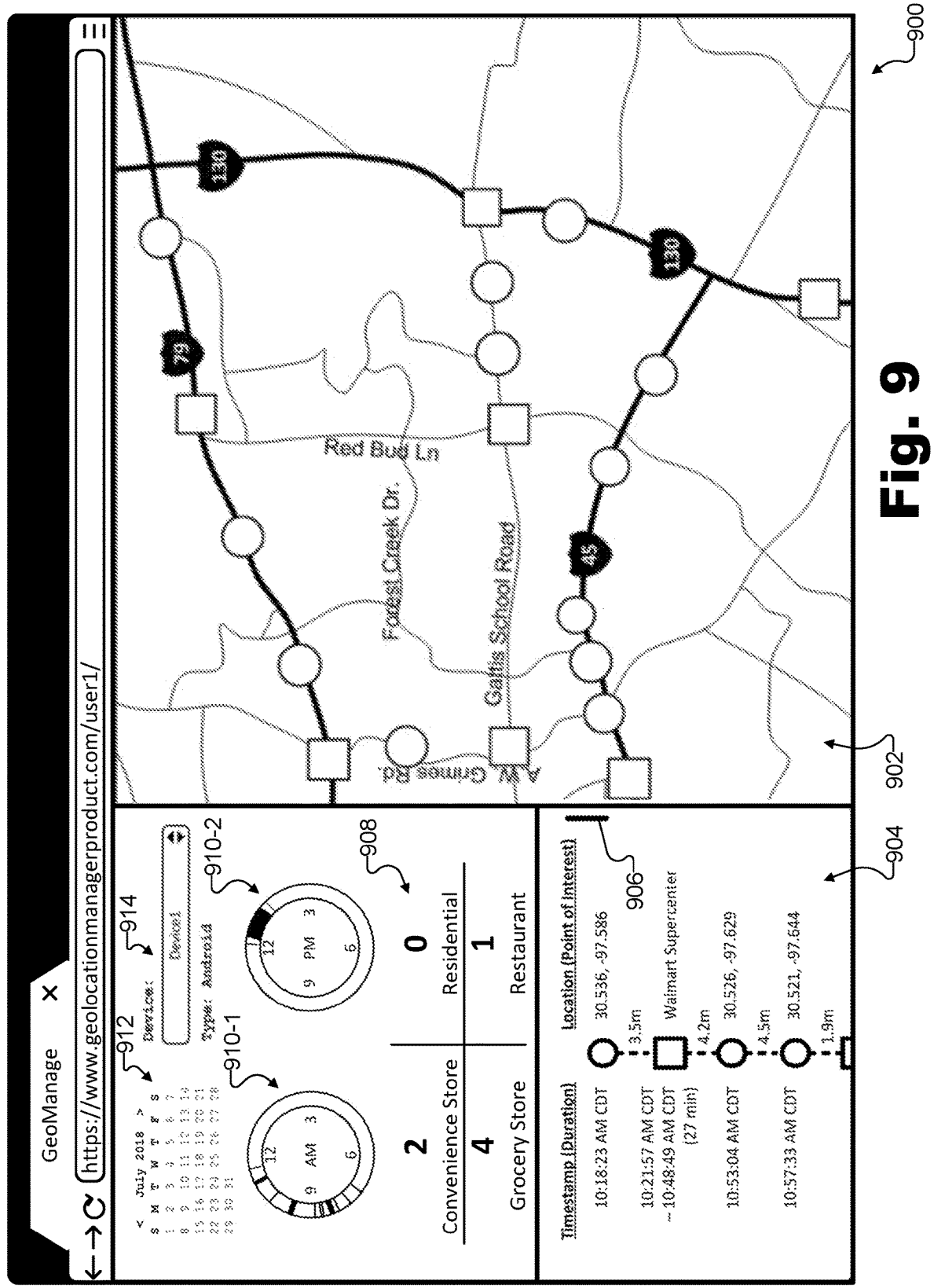
FIG. 9 illustrates an exemplary user interface by way of which historical and/or real-time geolocation data for a plurality of mobile devices is presented to a user according to principles described herein.

FIG. 9 illustrates an exemplary user interface 900 by way of which historical and/or real-time geolocation data for a plurality of mobile devices is presented to a user. For example, user interface 900 may be presented by system 100 to user 202 to facilitate user 202 in tracking and/or managing mobile devices 204 and/or the respective clients 208, vehicles, etc., that mobile devices 204 may be associated with.

As shown, user interface 900 may be presented as a single-page application, allowing user 202 to see various aspects of various types of geolocation data at once. For example, the single page application of user interface 900 may include a map 902 (e.g., similar to map 700), a path representation 904 (e.g., similar to path representation 400) of geolocation and/or dwell records that may correspond to records presented on map 902, and various other indicators and controls as may serve a particular implementation. Map 902 may be panned and zoomed manually by user 202 or automatically by system 100 based on records currently shown in path representation 904 and/or based on other controls described below. Path representation 904 may include an extended list of geolocation and/or dwell records for a path traversed over a particular time period, and may be scrolled through by way of a scrolling mechanism 906. As shown, both map 902 and path representation 904 may use representations of (e.g., record icons for) geolocation records that are visually differentiable from representations of (e.g., record icons for) dwell records. Specially, as shown, circular record icons may be used within map 902 and path representation 904 to represent geolocation records where the mobile device 204 was not detected to dwell, whereas square record icons may be used to represent dwell records where the mobile device 204 has been detected to have dwelled. In addition or as an alternative to these differentiable icon shapes, other aspects of the representations may also be used to make the geolocation record representations differentiable from the dwell record representations such as different colors, different blinking patterns, different sizes, different outlines, different fill patterns, and so forth.

Additionally, other controls and indicators included within user interface 900 may include a breakdown 908 of detected points of interest by type, one or more report modularity indicators 910 (i.e., indicators 910-1 and 910-2), a timeframe selector 912, a mobile device selector 914, and/or any other controls or indicators shown and/or as may serve a particular implementation.

Breakdown 908 may be configured to show user 202, at a glance, what types of dwells a selected mobile device has been determined to have made during a selected timeframe. For example, if a particular time, day, range of days, etc., is selected (e.g., by way of timeframe selector 912) for a particular mobile device 204 called "Device1" (e.g., selected by way of mobile device selector 914), breakdown 908 may indicate how many and what type of points of interest the client 208 associated with Device1 has visited during the selected time period. As shown, for instance, if work hours during Jul. 18, 2018, are selected by way of timeframe selector 912, and Device1 is selected by way of mobile device selector 914, breakdown 908 may indicate that Device1 was detected that day as dwelling at two "Convenience Store" points of interest, four "Grocery Store" points of interest, one "Restaurant" point of interest, and zero residential points of interest. In other examples, other types of points of interest may automatically be populated in breakdown 908 based on the timeframe and device selected and/or the historical geolocation determined for that device during that timeframe. In some examples, categories of points of interest may also be manually selected by user 202 depending on what user 202 wants to track or learn about a particular mobile device 204.

Modularity indicators 910 may be configured to show user 202, at a glance, how often (i.e., with what modularity) geolocation reports were received for a selected mobile device 204 during a selected timeframe. For example, indicator 910-1 may be associated with morning (AM) hours of a selected day while indicator 910-2 may be associated with afternoon and evening (PM) hours of the selected day. As shown, a dark line or segment may be drawn around indicators 910 corresponding to each geolocation report received from the mobile device 204. Where several geolocation reports were received in a relatively short amount of time, several dark lines may merge together to form thicker segments around indicators 910. Additionally or alternatively, indicators 910 may be configured to draw thicker segments to correspond to generated dwell records (e.g., corresponding to the duration of the dwell records), or may otherwise present detection information in any manner as may be useful to user 202 in a particular implementation.

Figure 10:
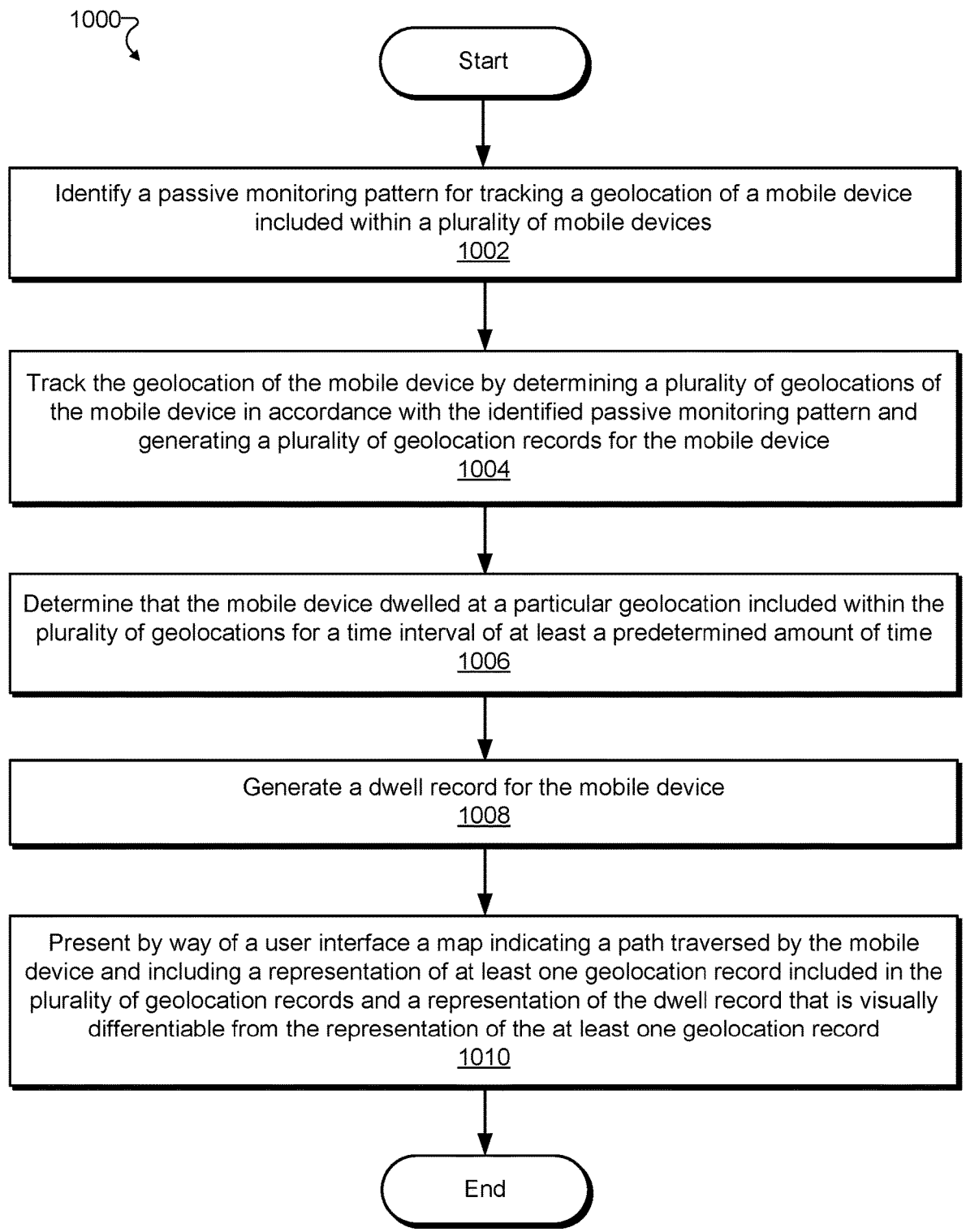
FIG. 10 illustrates an exemplary method for managing historical geolocation data for a plurality of mobile devices according to principles described herein.

FIG. 10 illustrates an exemplary method 1000 for managing historical geolocation data for a plurality of mobile devices. While FIG. 10 illustrates exemplary operations according to one embodiment, other embodiments may omit, add to, reorder, and/or modify any of the operations shown in FIG. 10. One or more of the operations shown in FIG. 10 may be performed by system 100, any components included therein, and/or any implementation thereof.

In operation 1002, a geolocation data management system configured to manage geolocations of a plurality of mobile devices may identify a passive monitoring pattern for tracking a geolocation of a mobile device included within the plurality of mobile devices. Operation 1002 may be performed in any of the ways described herein.

In operation 1004, the geolocation data management system may track the geolocation of the mobile device as the mobile device traverses a path during a time period. For example, the geolocation data management system may track the geolocation of the mobile device in operation 1004 by determining a plurality of geolocations of the mobile device as the mobile device traverses the path throughout the time period, and by generating a plurality of geolocation records for the mobile device. In some examples, the geolocation data management system may determine the plurality of geolocations throughout the time period in accordance with the identified passive monitoring pattern identified in operation 1002. Additionally, in the same or other examples, the geolocation data management system may generate each geolocation record in the plurality of geolocation records to include a timestamped coordinate set reported by the mobile device for a different one of the plurality of geolocations of the mobile device as the mobile device traverses the path. Operation 1004 may be performed in any of the ways described herein.

In operation 1006, the geolocation data management system may determine that the mobile device dwelled at a particular geolocation included within the plurality of geolocations. For instance, the geolocation data management system may determine that the mobile device dwelled at the particular geolocation based on a contiguous subset of geolocation records from the plurality of geolocation records. In some examples, the geolocation data management system may determine that the mobile device dwelled at the particular geolocation for certain amount of time during the time period, such as for a time interval of at least a predetermined amount of time. Operation 1006 may be performed in any of the ways described herein.

In operation 1008, the geolocation data management system may generate a dwell record for the mobile device. For instance, the geolocation data management system may generate the dwell record based on the determining in operation 1006 that the mobile device dwelled at the particular geolocation for at least the predetermined amount of time. As such, the dwell record may be generated to include a coordinate set for the particular geolocation and an interval timestamp representative of the time interval. Operation 1008 may be performed in any of the ways described herein.

In operation 1010, the geolocation data management system may present, by way of a user interface, a map indicating the path traversed by the mobile device during the time period. For instance, the map may include a representation of at least one geolocation record included in the plurality of geolocation records generated in operation 1004 and a representation of the dwell record generated in operation 1008. In some examples, the representation of the dwell record may be visually differentiable from the representation of the at least one geolocation record. Operation 1010 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 11:
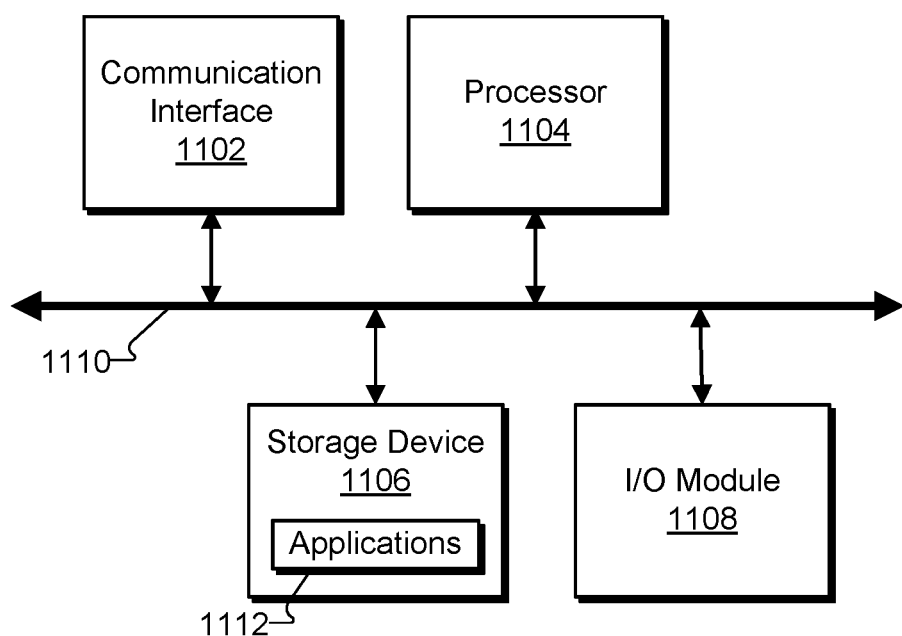
FIG. 11 illustrates an exemplary computing device according to principles described herein.

FIG. 11 illustrates an exemplary computing device 1100 that may be specifically configured to perform one or more of the processes described herein. As shown in FIG. 11, computing device 1100 may include a communication interface 1102, a processor 1104, a storage device 1106, and an input/output ("I/O") module 1108 communicatively connected via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1106. For example, data representative of one or more executable applications 1112 configured to direct processor 1104 to perform any of the operations described herein may be stored within storage device 1106. In some examples, data may be arranged in one or more databases residing within storage device 1106.

I/O module 1108 may include one or more I/O modules configured to receive user input and provide user output. One or more I/O modules may be used to receive input for a single virtual experience. I/O module 1108 may include any hardware, firmware, software, or combination thereof supportive of input and output capabilities. For example, I/O module 1108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1100. For example, one or more applications 1112 residing within storage device 1106 may be configured to direct processor 1104 to perform one or more processes or functions associated with facilities 102 through 106 of system 100. Likewise, storage facility 108 of system 100 may be implemented by or within storage device 1106.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:
1. A method comprising:
   determining, by a geolocation data management system configured to manage geolocations of a plurality of mobile devices, a real-time reported movement pattern of a mobile device included within the plurality of mobile devices;
   automatically establishing, by the geolocation data management system and based on the determined real-time reported movement pattern, a passive monitoring pattern to be used by the mobile device for tracking a geolocation of the mobile device;
   tracking, by the geolocation data management system, the geolocation of the mobile device as the mobile device traverses a path during a time period, the tracking including
      receiving, in accordance with the passive monitoring pattern, a plurality of geolocations of the mobile device as the mobile device traverses the path during the time period, and generating a plurality of geolocation records for the mobile device, each geolocation record in the plurality of geolocation records including a time-stamped coordinate set reported by the mobile device for a different one of the plurality of geolocations of the mobile device as the mobile device traverses the path;

determining, by the geolocation data management system based on a contiguous subset of geolocation records from the plurality of geolocation records, that the mobile device dwelled at a particular geolocation included within the plurality of geolocations for a time interval of at least a predetermined amount of time during the time period;

generating, by the geolocation data management system based on the determining that the mobile device dwelled at the particular geolocation for at least the predetermined amount of time, a dwell record for the mobile device including a coordinate set for the particular geolocation and an interval timestamp representative of the time interval; and presenting, by the geolocation data management system by way of a user interface, a map indicating the path traversed by the mobile device during the time period, the map including a first icon representing the dwell record and additional respective icons representing each of the plurality of geolocation records, wherein:
the first icon is of a first type of icon and the additional respective icons are of a second type of icon that is visually differentiable from the first type of icon, and
the first icon and each of the additional respective icons are labeled on the map with respective sequence numbers that correspond to a time order in which the dwell record and the plurality of geolocation records were generated.

2. The method of claim 1, wherein the tracking of the geolocation of the mobile device further includes directing, prior to the receiving of the plurality of geolocations of the mobile device, the mobile device to provide the plurality of geolocations in accordance with the passive monitoring pattern.

3. The method of claim 1, wherein the passive monitoring pattern is a combination time/event-based passive monitoring pattern configured to invoke the mobile device to provide the geolocation of the mobile device when the mobile device detects that the mobile device has moved at least a threshold distance, as well as when a scheduled trigger occurs in accordance with a predetermined schedule.

4. The method of claim 1, wherein the passive monitoring pattern is an event-based passive monitoring pattern configured to invoke the mobile device to provide the geolocation of the mobile device when the mobile device detects that the mobile device has moved at least a threshold distance, as well as when another type of predetermined triggering event relating to battery life of the mobile device occurs.

5. The method of claim 1, wherein the passive monitoring pattern is an event-based passive monitoring pattern configured to invoke the mobile device to cease providing the geolocation of the mobile device when a predetermined battery usage event occurs that comprises at least one of:
a detection that a predetermined overall battery usage threshold has been reached by the mobile device; or
a detection that a predetermined tracking battery usage threshold has been reached by the mobile device, the tracking battery usage threshold associated with battery power expended by location tracking operations performed by the mobile device including determining and reporting the plurality of geolocations.

6. The method of claim 1, wherein:
the automatically establishing of the passive monitoring pattern further includes determining a real-time reported battery usage of the mobile device and automatically establishing the passive monitoring pattern further based on the determined real-time reported battery usage; and
the passive monitoring pattern corresponds to a monitoring mode in a plurality of preconfigured monitoring modes associated with the real-time reported battery usage of the mobile device and the real-time reported movement pattern of the mobile device.

7. The method of claim 1, further comprising determining, by the geolocation data management system in response to the determining that the mobile device dwelled at the particular geolocation, a point of interest corresponding to the particular geolocation;
wherein the dwell record generated for the mobile device further includes, along with the coordinate set and the interval timestamp, data representative of the point of interest corresponding to the particular geolocation.

8. A system comprising:
at least one physical computing device configured to manage geolocations of a plurality of mobile devices by performing operations including:
determining a real-time reported movement pattern of a mobile device included within the plurality of mobile devices;
automatically establishing, based on the determined real-time reported movement pattern, a passive monitoring pattern to be used by the mobile device for tracking a geolocation of the mobile device;
tracking the geolocation of the mobile device as the mobile device traverses a path during a time period, the tracking including
receiving, in accordance with the passive monitoring pattern, a plurality of geolocations of the mobile device as the mobile device traverses the path during the time period, and
generating a plurality of geolocation records for the mobile device, each geolocation record in the plurality of geolocation records including a time-stamped coordinate set reported by the mobile device for a different one of the plurality of geolocations of the mobile device as the mobile device traverses the path;
determining, based on a contiguous subset of geolocation records from the plurality of geolocation records, that the mobile device dwelled at a particular geolocation included within the plurality of geolocations for a time interval of at least a predetermined amount of time during the time period;
generating, based on the determining that the mobile device dwelled at the particular geolocation for at least the predetermined amount of time, a dwell record for the mobile device including a coordinate set for the particular geolocation and an interval timestamp representative of the time interval; and
presenting, by way of a user interface, a map indicating the path traversed by the mobile device during the time period, the map including a first icon representing the dwell record and additional respective icons representing each of the plurality of geolocation records, wherein:

the first icon is of a first type of icon and the additional respective icons are of a second type of icon that is visually differentiable from the first type of icon, and the first icon and each of the additional respective icons are labeled on the map with respective sequence numbers that correspond to a time order in which the dwell record and the plurality of geolocations records were generated.

9. The system of claim 8, wherein the tracking of the geolocation of the mobile device further includes directing, prior to the receiving of the plurality of geolocations of the mobile device, the mobile device to provide the plurality of geolocations in accordance with the passive monitoring pattern.

10. The system of claim 8, wherein the passive monitoring pattern is a combination time/event-based passive monitoring pattern configured to invoke the mobile device to provide the geolocation of the mobile device when the mobile device detects that the mobile device has moved at least a threshold distance, as well as when a scheduled trigger occurs in accordance with a predetermined schedule.

11. The system of claim 8, wherein the passive monitoring pattern is an event-based passive monitoring pattern configured to invoke the mobile device to provide the geolocation of the mobile device when the mobile device detects that the mobile device has moved at least a threshold distance, as well as when another type of predetermined triggering event relating to battery life of the mobile device occurs.

12. The system of claim 8, wherein the passive monitoring pattern is an event-based passive monitoring pattern configured to invoke the mobile device to cease providing the geolocation of the mobile device when a predetermined battery usage event occurs that comprises at least one of:
a detection that a predetermined overall battery usage threshold has been reached by the mobile device; or
a detection that a predetermined tracking battery usage threshold has been reached by the mobile device, the tracking battery usage threshold associated with battery power expended by location tracking operations performed by the mobile device including determining and reporting the plurality of geolocations.

13. The system of claim 8, wherein:
the at least one physical computing device further automatically establishes the passive monitoring pattern by determining a real-time reported battery usage of the mobile device and automatically establishing the passive monitoring pattern further based on the determined real-time reported battery usage; and
the passive monitoring pattern corresponds to a monitoring mode in a plurality of preconfigured monitoring modes associated with the real-time reported battery usage of the mobile device and the real-time reported movement pattern of the mobile device.

14. The system of claim 8, wherein:
the operations performed by the at least one physical computing device further include determining, in response to the determination that the mobile device dwelled at the particular geolocation, a point of interest corresponding to the particular geolocation; and
the dwell record generated for the mobile device further includes, along with the coordinate set and the interval timestamp, data representative of the point of interest corresponding to the particular geolocation.

15. A non-transitory computer-readable medium storing instructions that, when executed, direct at least one processor of a computing device to manage geolocations of a plurality of mobile devices by performing operations including:
determining a real-time reported movement pattern of a mobile device included within the plurality of mobile devices;
automatically establishing, based on the determined real-time reported movement pattern, a passive monitoring pattern to be used by the mobile device for tracking a geolocation of the mobile device;
tracking the geolocation of the mobile device as the mobile device traverses a path during a time period, the tracking including
receiving, in accordance with the passive monitoring pattern, a plurality of geolocations of the mobile device as the mobile device traverses the path during the time period, and
generating a plurality of geolocation records for the mobile device, each geolocation record in the plurality of geolocation records including a time-stamped coordinate set reported by the mobile device for a different one of the plurality of geolocations of the mobile device as the mobile device traverses the path;
determining, based on a contiguous subset of geolocation records from the plurality of geolocation records, that the mobile device dwelled at a particular geolocation included within the plurality of geolocations for a time interval of at least a predetermined amount of time during the time period;
generating, based on the determining that the mobile device dwelled at the particular geolocation for at least the predetermined amount of time, a dwell record for the mobile device including a coordinate set for the particular geolocation and an interval timestamp representative of the time interval; and
presenting, by way of a user interface, a map indicating the path traversed by the mobile device during the time period, the map including a first icon representing the dwell record and additional respective icons representing each of the plurality of geolocation records, wherein:
the first icon is of a first type of icon and the additional respective icons are of a second type of icon that is visually differentiable from the first type of icon, and
the first icon and each of the additional respective icons are labeled on the map with respective sequence numbers that correspond to a time order in which the dwell record and the plurality of geolocations records were generated.

16. The computer-readable medium of claim 15, wherein the tracking of the geolocation of the mobile device further includes directing, prior to the receiving of the plurality of geolocations of the mobile device, the mobile device to provide the plurality of geolocations in accordance with the passive monitoring pattern.

17. The computer-readable medium of claim 15, wherein the passive monitoring pattern is a combination time/event-based passive monitoring pattern configured to invoke the mobile device to provide the geolocation of the mobile device when the mobile device detects that the mobile device has moved at least the threshold distance, as well as when a scheduled trigger occurs in accordance with a predetermined schedule.

18. The computer-readable medium of claim 15, wherein the passive monitoring pattern is an event-based passive monitoring pattern configured to invoke the mobile device to provide the geolocation of the mobile device when the mobile device detects that the mobile device has moved at least a threshold distance, as well as when another type of predetermined triggering event relating to battery life of the mobile device occurs.

19. The computer-readable medium of claim 15, wherein:
the instructions, when executed, direct the at least one processor to further establish the passive monitoring pattern by determining of a real-time reported battery usage of the mobile device and automatically establishing the passive monitoring pattern further based on the determined real-time reported battery usage; and
the passive monitoring pattern corresponds to a monitoring mode in a plurality of preconfigured monitoring modes associated with the real-time reported battery usage of the mobile device and the real-time reported movement pattern of the mobile device.

20. The computer-readable medium of claim 15, wherein:
the instructions further direct the at least one processor to perform operations including determining, in response to the determination that the mobile device dwelled at the particular geolocation, a point of interest corresponding to the particular geolocation; and
the dwell record generated for the mobile device further includes, along with the coordinate set and the interval timestamp, data representative of the point of interest corresponding to the particular geolocation.

* * * * *